US012684577B2

(12) United States Patent
Hou et al.

(10) Patent No.: US 12,684,577 B2
(45) Date of Patent: Jul. 14, 2026

(54) COMMUNICATION METHOD AND APPARATUS

(71) Applicant: HUAWEI TECHNOLOGIES CO., LTD., Shenzhen (CN)

(72) Inventors: Hailong Hou, Beijing (CN); Juan Zheng, Beijing (CN); Chaojun Li, Beijing (CN); Yunhao Zhang, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 421 days.

(21) Appl. No.: 18/300,508

(22) Filed: Apr. 14, 2023

(65) Prior Publication Data

US 2023/0254868 A1     Aug. 10, 2023

Related U.S. Application Data

(63) Continuation of application No. PCT/CN2020/121695, filed on Oct. 16, 2020.

(51) Int. Cl.
*H04W 72/21* (2023.01)
*H04W 72/0453* (2023.01)

(52) U.S. Cl.
CPC ....... *H04W 72/21* (2023.01); *H04W 72/0453* (2013.01)

(58) Field of Classification Search
CPC . H04W 72/21; H04W 72/23; H04W 72/0453; H04L 5/0007; H04L 5/001;
(Continued)

(56) References Cited

U.S. PATENT DOCUMENTS 11,277,737 B2 *  3/2022  Xu .......................... H04W 72/51
11,805,524 B2 *  10/2023  Liou ..................... H04W 72/21
(Continued)

FOREIGN PATENT DOCUMENTS

CN       106664188 A      5/2017
CN       106717098 A      5/2017
(Continued)

OTHER PUBLICATIONS

ETRI, "Resource allocation for PUCCH," 3GPP TSG RAN WG1 Meeting 90bis, R1-1718007, Prague, CZ, Oct. 9-13, 2017, 7 pages.
(Continued)

*Primary Examiner* — Brian T O Connor
(74) *Attorney, Agent, or Firm* — Fish & Richardson P.C.

(57) ABSTRACT

Communication methods and apparatuses are provided. In an example method, a terminal device receives first indication information from a network device, where the first indication information indicates a first physical uplink control channel (PUCCH) resource set; and the terminal device determines the first PUCCH resource set based on the first indication information. The first PUCCH resource set is different from a second PUCCH resource set, or the first PUCCH resource set is partially the same as a second PUCCH resource set. The first PUCCH resource set is configured for a first-type terminal device, while the second PUCCH resource set is configured for a second-type terminal device. A maximum bandwidth supported by the first-type terminal device is less than a maximum bandwidth supported by the second-type terminal device.

20 Claims, 13 Drawing Sheets

(58) Field of Classification Search

CPC ... H04L 5/0012; H04L 5/0058; H04L 5/0094; H04L 5/0053

See application file for complete search history.

(56) References Cited

U.S. PATENT DOCUMENTS

| | | | | |
|---|---|---|---|---|
| 11,877,289 | B2 * | 1/2024 | Tsai | H04L 1/0026 |
| 11,968,670 | B2 * | 4/2024 | Datta | H04W 72/21 |
| 2019/0052910 | A1 | 2/2019 | Deshpande | |
| 2020/0127792 | A1 | 4/2020 | Xiong et al. | |
| 2020/0145169 | A1 | 5/2020 | Zhou et al. | |
| 2020/0221448 | A1 | 7/2020 | Park | |
| 2020/0228966 | A1 * | 7/2020 | Xu | H04L 5/0053 |
| 2020/0236672 | A1 | 7/2020 | Myung et al. | |
| 2022/0046635 | A1 * | 2/2022 | Liou | H04B 7/0691 |
| 2022/0061117 | A1 * | 2/2022 | Liou | H04W 76/19 |
| 2022/0287102 | A1 * | 9/2022 | Futaki | H04W 74/0833 |
| 2025/0048444 | A1 * | 2/2025 | Futaki | H04L 5/0092 |

FOREIGN PATENT DOCUMENTS

| | | |
|---|---|---|
| CN | 109392131 A | 2/2019 |
| CN | 111525995 A | 8/2020 |

OTHER PUBLICATIONS

Ericsson, "New SID on support of reduced capability NR devices," 3GPP TSG RAN Meeting #86, RP-193238, Sitges, Spain, Dec. 9-12, 2019, 5 pages.

International Search Report and Written Opinion in International Appln. No. PCT/CN2020/121695, mailed on Jul. 15, 2021, 14 pages (with English translation).

Extended European Search Report in European Appln No. 20957289.0, dated Oct. 12, 2023, 8 pages.

Hearing Notice in Indian Appln. No, 2023-17027658, mailed on Mar. 13, 2026, 2 pages.

* cited by examiner

COMMUNICATION METHOD AND APPARATUS

CROSS-REFERENCE TO RELATED APPLICATIONS

This application is a continuation of International Application No. PCT/CN2020/121695, filed on Oct. 16, 2020, the disclosure of which is hereby incorporated by reference in its entirety.

TECHNICAL FIELD

This application relates to the field of wireless communication technologies, and in particular, to a communication method and apparatus.

BACKGROUND

In new radio (new radio, NR), a terminal feeds back uplink control information (UCI) to a network device through a physical uplink control channel (PUCCH). The PUCCH resource is configured by the network device. PUCCH resources are classified into a common PUCCH resource and a dedicated PUCCH resource. The common PUCCH resource is a PUCCH resource that is used by all terminal devices in a cell before the network device configures the dedicated PUCCH resource. The dedicated PUCCH resource is a dedicated PUCCH resource configured by the network device for a terminal device after the terminal device enters a radio resource control (RRC) connected mode.

Currently, in an NR system, a PUCCH supports frequency hopping (frequency hopping) transmission. A frequency hopping location of a common PUCCH resource is bound to an initial uplink bandwidth part (BWP) of a terminal device, and is at two ends of the initial uplink BWP. Because the initial uplink BWP may be configured as 100 MHz at most, for a terminal device with an existing bandwidth of 100 MHz, two frequency hopping transmissions may be performed on a frequency domain resource with a bandwidth of 100 MHz.

A reduced capability (REDCAP) terminal device is introduced into the NR system. A bandwidth supported by the REDCAP terminal device is less than 100 MHz, and is usually 20 MHz. If an existing standard is still used, the REDCAP terminal device performs PUCCH frequency hopping transmission within a bandwidth of 100 MHz. Consequently, transmission performance deteriorates.

In conclusion, when a bandwidth supported by a terminal device is less than 100 MHz, how to allocate a PUCCH resource to the terminal device is an urgent problem to be resolved.

SUMMARY

An objective of this application is to provide a communication method and apparatus, to resolve a problem of how to allocate a PUCCH resource to a terminal device.

According to a first aspect, an embodiment of this application provides a communication method. The method is applicable to a scenario in which a network device configures a PUCCH resource for a terminal device. The method is executed by the terminal device or a module in the terminal device. Herein, an example in which the terminal device is an execution body is used for description. The method includes: The terminal device receives first indication information from a network device, where the first indication information indicates a first physical uplink control channel PUCCH resource set; and the terminal device determines the first PUCCH resource set based on the first indication information. The first PUCCH resource set is the same as a second PUCCH resource set, the first PUCCH resource set is different from a second PUCCH resource set, or the first PUCCH resource set is partially the same as a second PUCCH resource set. The first PUCCH resource set includes at least one PUCCH resource, and the first PUCCH resource set is configured for a first-type terminal device. The second PUCCH resource set includes at least one PUCCH resource, and the second PUCCH resource set is configured for a second-type terminal device. A maximum bandwidth supported by the first-type terminal device is less than a maximum bandwidth supported by the second-type terminal device.

When the network device configures a same PUCCH resource set for the first-type terminal device and the second-type terminal, the two types of terminal devices can reuse the same PUCCH resource set, to reduce PUCCH resource overheads in a network or a cell, and improve resource utilization in the network or the cell. In addition, for the first-type terminal device, when a PUCCH resource frequency hopping range exceeds the maximum bandwidth of the terminal and radio frequency retuning needs to be performed, a start time point or a time domain location of the radio frequency retuning is defined to ensure PUCCH transmission performance of the first-type terminal as much as possible, and impact on PUCCH transmission of the second-type terminal is reduced as much as possible.

The network device configures different PUCCH resource sets for the first-type terminal device and the second-type terminal, so that a PUCCH resource capacity is expanded, to support more users in accessing the network device. In addition, different PUCCH resource sets are configured for the first-type terminal device, so that it can be ensured that when the first-type terminal device transmits a PUCCH, a frequency domain range of frequency hopping transmission does not exceed the maximum bandwidth supported by the first-type terminal device. This ensures that PUCCH transmission performance of the first-type terminal does not deteriorate, and reduces impact on PUCCH transmission of the second-type terminal as much as possible.

The network device configures two partially same PUCCH resource sets for the first-type terminal device and the second-type terminal, and some frequency domain resources or some time domain resources of the two PUCCH resource sets are the same, so that some resources in an existing PUCCH resource set can be reused as much as possible to reduce network PUCCH resource overheads, and it is ensured that PUCCH transmission performance of the first-type terminal device does not deteriorate.

In a possible implementation of the first aspect, when the first PUCCH resource set is different from the second PUCCH resource set, a frequency domain resource of the first PUCCH resource set does not overlap a frequency domain resource of the second PUCCH resource set.

In a possible implementation of the first aspect, the frequency domain resource of the first PUCCH resource set includes a first frequency domain resource and a second frequency domain resource, and the frequency domain resource of the second PUCCH resource set includes a third frequency domain resource and a fourth frequency domain resource; and the first frequency domain resource is contiguous to the third frequency domain resource, or the second frequency domain resource is contiguous to the fourth frequency domain resource, where a location index of the first frequency domain resource is less than a location index of the second frequency domain resource, and a location index of the third frequency domain resource is less than a location index of the fourth frequency domain resource.

Some frequency domain resources of the first PUCCH resource set and the second PUCCH resource set are configured or predefined to be contiguous, so that network or cell resource fragmentation caused by PUCCH resources is effectively decreased or reduced, and network resource utilization is improved.

In a possible implementation of the first aspect, a frequency domain resource of the first PUCCH resource set includes a first frequency domain resource and a second frequency domain resource, and a frequency domain resource of the second PUCCH resource set includes a third frequency domain resource and a fourth frequency domain resource; and when the first PUCCH resource set is partially the same as the second PUCCH resource set, a location index of the first frequency domain resource of the first PUCCH resource set is the same as a location index of the third frequency domain resource of the second PUCCH resource set, or a location index of the second frequency domain resource of the first PUCCH resource set is the same as a location index of the fourth frequency domain resource of the second PUCCH resource set.

In a possible implementation of the first aspect, a time domain resource of the first PUCCH resource set includes a first time domain resource and a second time domain resource, and a time domain resource of the second PUCCH resource set includes a third time domain resource and a fourth time domain resource; and when the first PUCCH resource set is partially the same as the second PUCCH resource set, the first time domain resource of the first PUCCH resource set is the same as the third time domain resource of the second PUCCH resource set, or the second time domain resource of the first PUCCH resource set is the same as the fourth time domain resource of the second PUCCH resource set.

In a possible implementation of the first aspect, there is an interval of M symbols between an end location of a symbol for a first frequency hopping transmission on a PUCCH resource in the first PUCCH resource set and a start location of a symbol occupied by the terminal device for performing a second frequency hopping transmission in the first PUCCH resource. M is an integer greater than 0.

In a possible implementation of the first aspect, the first PUCCH resource set is located in a first initial uplink bandwidth part, and the second PUCCH resource set is located in a second initial uplink bandwidth part; or both the first PUCCH resource and the second PUCCH resource are located in a second initial uplink bandwidth part, where the first initial uplink bandwidth part is an initial uplink bandwidth part configured for the first-type terminal device, and the second initial uplink bandwidth part is an initial uplink bandwidth part configured for the second-type terminal device.

In a possible implementation of the first aspect, the first indication information includes at least one of the following: a frequency domain location $$RB_{start}^{first}$$

that is in the first PUCCH resource set and at which the terminal device performs the first frequency hopping transmission; and
a frequency domain location $$RB_{start}^{second}$$

that is in the first PUCCH resource set and at which the terminal device performs the second frequency hopping transmission.

In a possible implementation of the first aspect, the terminal device receives second indication information, where the second indication information is used by the terminal device to determine one PUCCH resource in the first PUCCH resource set; and the terminal device sends uplink control information on the PUCCH resource indicated by the second indication information.

In a possible implementation of the first aspect, when a frequency domain range of two adjacent frequency hopping transmissions on the PUCCH resource in the first PUCCH resource set sent by the terminal device is greater than a maximum bandwidth supported by the terminal device, X time domain symbols in the time domain resource in which the first PUCCH resource set is located are not for transmitting a PUCCH, where X is a positive integer, X is less than Y, and Y is a quantity of time domain symbols occupied by the first PUCCH resource set.

In a possible implementation of the first aspect, a center frequency of a radio frequency link of the terminal device is determined based on the first PUCCH resource set.

In a possible implementation of the first aspect, time domain resources, frequency domain resources, and code domain resources of the first PUCCH resource set and the second PUCCH resource set are the same.

In a possible implementation of the first aspect, the first indication information is further for configuring the second PUCCH resource set.

In a possible implementation of the first aspect, a center frequency of a radio frequency link of the terminal device is determined based on the first PUCCH resource set.

In a possible implementation of the first aspect, when a frequency domain offset value of two adjacent frequency hopping transmissions performed by the terminal device on the first PUCCH resource is greater than a maximum bandwidth supported by the terminal device, X symbols in the time domain resource in which the first PUCCH resource set is located are not for transmitting a PUCCH, where X is a positive integer, X is less than Y, and Y is a quantity of symbols occupied by the first PUCCH resource set.

When the frequency domain offset value of the two adjacent frequency hopping transmissions is greater than the maximum bandwidth supported by the terminal device, the terminal device needs to perform radio frequency retuning. Therefore, the PUCCH may not be transmitted in the X symbols in this period, to reduce impact of the radio frequency retuning on uplink transmission.

According to a second aspect, this application further provides a communication apparatus. The communication apparatus has a function of implementing any method provided in the first aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device, for example, a network device.

In a possible implementation, the communication apparatus includes corresponding function modules, respectively configured to implement the steps in the foregoing method. The function may be implemented by hardware, or may be implemented by hardware executing corresponding software. The hardware or the software includes one or more modules corresponding to the foregoing function.

In a possible implementation, a structure of the communication apparatus includes a processing module and a communication module. These modules may perform corresponding functions in the foregoing method examples. For details, refer to descriptions in the method provided in the first aspect. Details are not described herein again.

According to a third aspect, an embodiment of this application provides a communication method. The method is applicable to a scenario in which a network device configures a PUCCH resource for a terminal device. The method is executed by the network device or a module in the network device. Herein, an example in which the network device is an execution body is used for description. The method includes: The network device determines a first physical uplink control channel PUCCH resource set; and the network device sends first indication information to the terminal device, where the first indication information indicates the first PUCCH resource set. The first PUCCH resource set is the same as a second PUCCH resource set, the first PUCCH resource set is different from a second PUCCH resource set, or the first PUCCH resource set is partially the same as a second PUCCH resource set. The first PUCCH resource set includes at least one PUCCH resource, and the first PUCCH resource set is configured for a first-type terminal device. The second PUCCH resource set includes at least one PUCCH resource, and the second PUCCH resource set is configured for a second-type terminal device. A maximum bandwidth supported by the first-type terminal device is less than a maximum bandwidth supported by the second-type terminal device.

In a possible implementation of the third aspect, when the first PUCCH resource set is different from the second PUCCH resource set, a frequency domain resource of the first PUCCH resource set does not overlap a frequency domain resource of the second PUCCH resource set.

In a possible implementation of the third aspect, the frequency domain resource of the first PUCCH resource set includes a first frequency domain resource and a second frequency domain resource, and the frequency domain resource of the second PUCCH resource set includes a third frequency domain resource and a fourth frequency domain resource; and the first frequency domain resource is contiguous to the third frequency domain resource, or the second frequency domain resource is contiguous to the fourth frequency domain resource, where a location index of the first frequency domain resource is less than a location index of the second frequency domain resource, and a location index of the third frequency domain resource is less than a location index of the fourth frequency domain resource.

In a possible implementation of the third aspect, a frequency domain resource of the first PUCCH resource set includes a first frequency domain resource and a second frequency domain resource, and a frequency domain resource of the second PUCCH resource set includes a third frequency domain resource and a fourth frequency domain resource; and when the first PUCCH resource set is partially the same as the second PUCCH resource set, a location index of the first frequency domain resource of the first PUCCH resource set is the same as a location index of the third frequency domain resource of the second PUCCH resource set, or a location index of the second frequency domain resource of the first PUCCH resource set is the same as a location index of the fourth frequency domain resource of the second PUCCH resource set.

In a possible implementation of the third aspect, a time domain resource of the first PUCCH resource set includes a first time domain resource and a second time domain resource, and a time domain resource of the second PUCCH resource set includes a third time domain resource and a fourth time domain resource; and when the first PUCCH resource set is partially the same as the second PUCCH resource set, the first time domain resource of the first PUCCH resource set is the same as the third time domain resource of the second PUCCH resource set, or the second time domain resource of the first PUCCH resource set is the same as the fourth time domain resource of the second PUCCH resource set.

In a possible implementation of the third aspect, there is an interval of M symbols between an end location of a symbol for a first frequency hopping transmission on a PUCCH resource in the first PUCCH resource set and a start location of a symbol occupied by the terminal device for performing a second frequency hopping transmission in the first PUCCH resource. M is an integer greater than 0.

In a possible implementation of the third aspect, the first PUCCH resource set is located in a first initial uplink bandwidth part, and the second PUCCH resource set is located in a second initial uplink bandwidth part; or both the first PUCCH resource and the second PUCCH resource are located in a second initial uplink bandwidth part, where the first initial uplink bandwidth part is an initial uplink bandwidth part configured for the first-type terminal device, and the second initial uplink bandwidth part is an initial uplink bandwidth part configured for the second-type terminal device.

In a possible implementation of the third aspect, the first indication information includes at least one of the following:
a frequency domain location $$RB_{start}^{first}$$

that is in the first PUCCH resource set and at which the terminal device performs the first frequency hopping transmission; and
a frequency domain location $$RB_{start}^{second}$$

that is in the first PUCCH resource set and at which the terminal device performs the second frequency hopping transmission.

In a possible implementation of the third aspect, the network device sends second indication information to the terminal device, where the second indication information is used by the terminal device to determine one PUCCH resource in the first PUCCH resource set, and the PUCCH resource is for sending uplink control information.

In a possible implementation of the third aspect, when a frequency domain range of two adjacent frequency hopping transmissions on the PUCCH resource in the first PUCCH resource set sent by the terminal device is greater than a maximum bandwidth supported by the terminal device, X time domain symbols in the time domain resource in which the first PUCCH resource set is located are not for transmitting a PUCCH, where X is a positive integer, X is less than Y, and Y is a quantity of time domain symbols occupied by the first PUCCH resource set.

In a possible implementation of the third aspect, a center frequency of a radio frequency link of the terminal device is determined based on the first PUCCH resource set.

In a possible implementation of the third aspect, time domain resources, frequency domain resources, and code domain resources of the first PUCCH resource set and the second PUCCH resource set are the same.

In a possible implementation of the third aspect, the first indication information is further for configuring the second PUCCH resource set.

In a possible implementation of the third aspect, a center frequency of a radio frequency link of the terminal device is determined based on the first PUCCH resource set.

In a possible implementation of the third aspect, when a frequency domain offset value of two adjacent frequency hopping transmissions performed by the terminal device on the first PUCCH resource is greater than a maximum bandwidth supported by the terminal device, X symbols in the time domain resource in which the first PUCCH resource set is located are not for transmitting a PUCCH, where X is a positive integer, X is less than Y, and Y is a quantity of symbols occupied by the first PUCCH resource set.

According to a fourth aspect, this application further provides a communication apparatus. The communication apparatus has a function of implementing any method provided in the second aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus in performing a corresponding function of the network device in the foregoing method. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device, for example, a terminal device.

In a possible implementation, the communication apparatus includes corresponding function modules, respectively configured to implement the steps in the foregoing method. The function may be implemented by hardware, or may be implemented by hardware executing corresponding software. The hardware or the software includes one or more modules corresponding to the foregoing function.

In a possible implementation, a structure of the communication apparatus includes a processing module and a communication module. These modules may perform corresponding functions in the foregoing method examples. For details, refer to descriptions in the method provided in the second aspect. Details are not described herein again.

According to a fifth aspect, an embodiment of this application provides a communication method. The method is applicable to a scenario in which a network device configures a PUCCH resource for a terminal device. The method is executed by the terminal device or a module in the terminal device. Herein, an example in which the terminal device is an execution body is used for description. The method includes: The terminal device receives a configuration instruction from the network device, where the configuration instruction indicates P uplink bandwidth parts, Q uplink bandwidth parts in the P uplink bandwidth parts include a dedicated physical uplink control channel PUCCH resource set, Q is an integer greater than 0 and less than P, and P is an integer greater than 0; and the terminal device determines the P uplink bandwidth parts based on the configuration instruction.

In the foregoing process, dedicated PUCCH resources are configured only on some BWPs, so that PUCCH overheads can be reduced, and uplink resource fragmentation can be alleviated. Further, when there is no PUCCH resource, uplink control information is sent through a PUSCH or another BWP is switched to, so that flexibility of PUCCH transmission can be improved, and timely and effective transmission of a PUCCH can be ensured.

In a possible implementation of the fifth aspect, when the terminal device determines to send uplink control information in a currently used first uplink bandwidth part, if the first uplink bandwidth part does not include a dedicated PUCCH resource set, the terminal device sends the uplink control information through a physical uplink shared channel PUSCH resource included in the first uplink bandwidth part. The first uplink bandwidth part is one of the P uplink bandwidth parts.

In a possible implementation of the fifth aspect, when the terminal device determines to send uplink control information in a currently used first uplink bandwidth part, if the first uplink bandwidth part does not include a dedicated PUCCH resource set and does not include a PUSCH resource, the terminal device switches to a second uplink bandwidth part. The second uplink bandwidth part includes the dedicated PUCCH resource set, and the second uplink bandwidth part is one of the P uplink bandwidth parts.

The terminal device sends the uplink control information through the dedicated PUCCH resource set in the second uplink bandwidth part.

In a possible implementation of the fifth aspect, before switching to the second uplink bandwidth part, the method further includes the following.

The terminal device receives a switch command from the network device, where the switch command indicates the terminal device to switch to the second uplink bandwidth part; or the terminal device switches to the second uplink bandwidth part according to a predefined rule.

According to a sixth aspect, this application further provides a communication apparatus. The communication apparatus has a function of implementing any method provided in the fifth aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device, for example, a network device.

In a possible implementation, the communication apparatus includes corresponding function modules, respectively configured to implement the steps in the foregoing method. The function may be implemented by hardware, or may be implemented by hardware executing corresponding software. The hardware or the software includes one or more modules corresponding to the foregoing function.

In a possible implementation, a structure of the communication apparatus includes a processing module and a communication module. These modules may perform corresponding functions in the foregoing method examples. For details, refer to descriptions in the method provided in the fifth aspect. Details are not described herein again.

According to a seventh aspect, an embodiment of this application provides a communication method. The method is applicable to a scenario in which a network device configures a PUCCH resource for a terminal device. The method is executed by the network device or a module in the network device. Herein, an example in which the network device is an execution body is used for description. The method includes: The network device configures P uplink bandwidth parts, where Q uplink bandwidth parts in the P uplink bandwidth parts include a dedicated PUCCH resource set, Q is an integer greater than 0 and less than or equal to P, and P is an integer greater than 0; and the network device sends a configuration instruction to the terminal device, where the configuration instruction indicates the P uplink bandwidth parts.

According to an eighth aspect, this application further provides a communication apparatus. The communication apparatus has a function of implementing any method provided in the seventh aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus in performing a corresponding function of the network device in the foregoing method. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device, for example, a terminal device.

In a possible implementation, the communication apparatus includes corresponding function modules, respectively configured to implement the steps in the foregoing method. The function may be implemented by hardware, or may be implemented by hardware executing corresponding software. The hardware or the software includes one or more modules corresponding to the foregoing function.

In a possible implementation, a structure of the communication apparatus includes a processing module and a communication module. These modules may perform corresponding functions in the foregoing method examples. For details, refer to descriptions in the method provided in the seventh aspect. Details are not described herein again.

According to a ninth aspect, a communication apparatus is provided. The communication apparatus includes a processor and a communication interface. The communication interface is configured to: receive a signal from another communication apparatus other than the communication apparatus and transmit the signal to the processor, or send, to another communication apparatus other than the communication apparatus, a signal from the processor. The processor is configured to implement the method in any one of the first aspect or the possible implementations of the first aspect by using a logic circuit or executing code instructions.

According to a tenth aspect, a communication apparatus is provided. The communication apparatus includes a processor and a communication interface. The communication interface is configured to: receive a signal from another communication apparatus other than the communication apparatus and transmit the signal to the processor, or send, to another communication apparatus other than the communication apparatus, a signal from the processor. The processor is configured to implement a function module of the method in any one of the third aspect or the possible implementations of the third aspect by using a logic circuit or executing code instructions.

According to an eleventh aspect, a communication apparatus is provided. The communication apparatus includes a processor and a communication interface. The communication interface is configured to: receive a signal from another communication apparatus other than the communication apparatus and transmit the signal to the processor, or send, to another communication apparatus other than the communication apparatus, a signal from the processor. The processor is configured to implement a function module of the method in any one of the fifth aspect or the possible implementations of the fifth aspect by using a logic circuit or executing code instructions.

According to a twelfth aspect, a communication apparatus is provided. The communication apparatus includes a processor and a communication interface. The communication interface is configured to: receive a signal from another communication apparatus other than the communication apparatus and transmit the signal to the processor, or send, to another communication apparatus other than the communication apparatus, a signal from the processor. The processor is configured to implement a function module of the method in any one of the seventh aspect or the possible implementations of the seventh aspect by using a logic circuit or executing code instructions.

According to a thirteenth aspect, a computer-readable storage medium is provided. The computer-readable storage medium stores a computer program or instructions. When the computer program or the instructions are executed by a processor, the method in any one of the first aspect, the third aspect, the fifth aspect, the seventh aspect, or the possible implementations of the foregoing aspects is implemented.

According to a fourteenth aspect, a computer program product including instructions is provided. When the instructions are run by a processor, the method in any one of the first aspect, the third aspect, the fifth aspect, the seventh aspect, or the possible implementations of the foregoing aspects is implemented.

According to a fifteenth aspect, a chip system is provided. The chip system includes a processor, and may further include a memory, to implement the method in any one of the first aspect, the third aspect, the fifth aspect, the seventh aspect, or the possible implementations of the foregoing aspects. The chip system may include a chip, or may include a chip and another discrete component.

According to a sixteenth aspect, a communication system is provided. The system includes the apparatus (for example, a terminal device) according to the second aspect and the apparatus (for example, a network device) according to the fourth aspect.

According to a seventeenth aspect, a communication system is provided. The system includes the apparatus (for example, a terminal device) according to the sixth aspect and the apparatus (for example, a network device) according to the eighth aspect.

DESCRIPTION OF EMBODIMENTS

The following further describes in detail embodiments of this application with reference to accompanying drawings.

The technical solutions in embodiments of this application may be applied to various communication systems, for example, a long term evolution (LTE) system, an LTE frequency division duplex (FDD) system, an LTE time division duplex (TDD) system, and an NR system. This is not limited herein.

A terminal device in embodiments of this application may be a device having a wireless transceiver function or a chip that can be disposed in any device, or may also be referred to as user equipment (UE), an access terminal, a subscriber unit, a remote terminal, a mobile device, a user terminal, a wireless communication device, a user agent, or a user apparatus. The terminal device in embodiments of this application may be a mobile phone (mobile phone), a tablet computer (Pad), a virtual reality (VR) terminal, an augmented reality (AR) terminal, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), or the like.

A network device is mainly responsible for providing a wireless connection for the terminal device, to ensure reliable transmission of uplink data and downlink data of the terminal device. The network device may be a next generation base station (gNB) in an NR system, an evolved node (eNB) in an LTE system, or the like. When the network device is a gNB, the network device may include a central unit (CU) and a distributed unit (DU).

Figure 1:
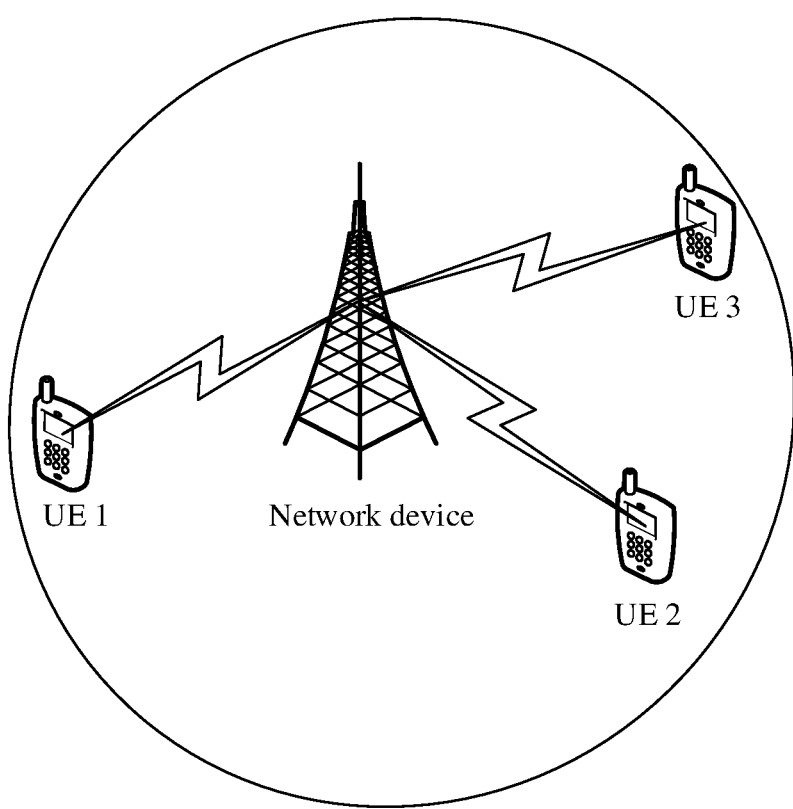
FIG. 1 is a schematic diagram of an architecture of a communication system applicable to an embodiment of this application.

For example, a method provided in embodiments of this application may be applied to a communication system shown in FIG. 1. One single-cell communication system includes a network device and three terminal devices (represented by a UE 1 to a UE 3 respectively). The UE 1 to the UE 3 may separately or simultaneously send uplink data to the network device, and the network device may separately or simultaneously send downlink data to the UE 1 to the UE 3. It should be understood that FIG. 1 is merely an example for description, and a quantity of terminal devices, a quantity of network devices, and a quantity of cells served by a network device that are included in the communication system are not specifically limited.

The terminal device in embodiments of this application is an entity that is on a user side and that is configured to receive or transmit a signal. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit (subscriber unit), a subscriber station (subscriber station), a mobile station (mobile station), a remote station (remote station), an access point (access point), a remote terminal (remote terminal), an access terminal (access terminal), a user terminal (user terminal), a user agent (user agent), a user device (user device), user equipment (UE), or the like. A common terminal device includes, for example, a mobile phone, a tablet computer, a notebook computer, a palmtop computer, a mobile internet device (MID), and a wearable device such as a smart watch, a smart band, or a pedometer. However, this is not limited in embodiments of this application.

A terminal device in this application may be a first-type terminal device or a second-type terminal device, and the first-type terminal device and the second-type terminal device may have at least one of the following distinguishing features.

1. Different bandwidth capabilities: A bandwidth capability may be represented by a carrier bandwidth. For example, a maximum bandwidth supported by the first-type terminal device is small, for example, at least one of 50 MHz, 40 MHz, 20 MHz, 15 MHz, 10 MHz, or 5 MHz, and a maximum bandwidth supported by the second-type terminal device is large, for example, 100 MHz.

2. Different quantities of transmit and receive antennas: For example, the first-type terminal device may support 2R1T (two receive antennas and one transmit antenna), or 1R1T (one receive antenna and one transmit antenna). The second-type terminal device may support 4R2T (four receive antennas and two transmit antennas). It may be understood that, if a same data transmission rate is implemented, because a quantity of transmit and receive antennas of the first-type terminal device is less than a quantity of transmit and receive antennas of the second-type terminal device, maximum coverage that can be implemented for data transmission between the first-type terminal device and a base station is less than maximum coverage that can be implemented for data transmission between the second-type terminal device and the base station.

3. Different maximum uplink transmit powers: For example, a maximum uplink transmit power of the first-type terminal device may be a value from 4 decibel-milliwatts (dBm) to 20 dBm. A maximum uplink transmit power of the second-type terminal device may be 23 dBm or 26 dBm.

4. Different protocol releases: The first-type terminal device may be a terminal device in NR release 17 (release-17, Rel-17) or a release later than NR Rel-17. The second-type terminal device may be, for example, a terminal device in NR release 15 (release-15, Rel-15) or NR release 16 (release-16, Rel-16). The second-type terminal device may also be referred to as an NR legacy (NR legacy) terminal device.

5. Different carrier aggregation capabilities: For example, the first-type terminal device does not support carrier aggregation, and the second-type terminal device can support carrier aggregation. For another example, both the first-type terminal device and the second-type terminal device can support carrier aggregation, but a maximum quantity of carriers simultaneously supported by the first-type terminal device for aggregation is less than a maximum quantity of carriers simultaneously supported by the second-type terminal device for aggregation. For example, the first-type terminal device simultaneously supports aggregation of a maximum of two carriers, and the second-type terminal device can simultaneously support aggregation of a maximum of five carriers or 32 carriers.

6. Different duplex capabilities: For example, the first-type terminal device supports half-duplex frequency division duplex (FDD). The second-type terminal device supports full-duplex FDD.

7. Different data processing time capabilities: For example, a minimum delay between receiving downlink data by the first-type terminal device and sending a feedback for the downlink data by the first-type terminal device is greater than a minimum delay between receiving downlink data by the second-type terminal device and sending a feedback for the downlink data by the second-type terminal device; and/or a minimum delay between sending uplink data by the first-type terminal device and receiving a feedback for the uplink data by the first-type terminal device is greater than a minimum delay between sending uplink data by the second-type terminal device and receiving a feedback for the uplink data by the second-type terminal device.

8. Different processing capabilities (abilities/capabilities): For example, a baseband processing capability of the first-type terminal device is lower than a baseband processing capability of the second-type terminal device. The baseband processing capability may include at least one of the following: a maximum quantity of multiple-input multiple-output (MIMO) layers supported by a terminal device during data transmission, a quantity of hybrid automatic repeat request (hybrid automatic repeat request, HARQ) processes supported by a terminal device, and a maximum transport block size (TBS) supported by a terminal device.

9. Different uplink and/or downlink peak transmission rates: A peak transmission rate is a maximum data transmission rate that can be reached by a terminal device in a unit of time (for example, per second). An uplink peak rate supported by the first-type terminal device may be lower than an uplink peak rate supported by the second-type terminal device, and/or a downlink peak rate supported by the first-type terminal device may be lower than a downlink peak rate supported by the second-type terminal device. For example, the uplink peak rate of the first-type terminal device is less than or equal to 50 Mbps, and the downlink peak rate of the first-type terminal device is less than or equal to 150 Mbps; and the uplink peak rate of the second-type terminal device is greater than or equal to 50 Mbps, and the downlink peak rate of the second-type terminal device is greater than or equal to 150 Mbps. For another example, the uplink peak rate or the downlink peak rate of the first-type terminal device is at a hundred-Mbps level, and the uplink peak rate or the downlink peak rate of the second-type terminal device is at a Gbps level.

10. Different buffer (buffer) sizes: A buffer may be understood as a total layer 2 (L2) buffer size, and indicates a sum of a quantity of bytes buffered by a terminal device for all radio bearers in a radio link control (radio link control, RLC) transmit window, receive window, and reordering window, and in a packet data convergence protocol (PDCP) reordering window. Alternatively, a buffer may be understood as a total quantity of soft channel bits that can be used for HARQ processing.

The foregoing is merely an example, and there may be another difference between the first-type terminal device and the second-type terminal device. Examples are not described one by one herein.

Optionally, in embodiments of this application, the first-type terminal device may be a REDCAP terminal device in an NR system, or the first-type terminal device may also be referred to as a low capability terminal device, a reduced capability terminal device, REDCAP UE, Reduced Capacity UE, mMTC UE, or the like. The second-type terminal device may be a legacy capability, normal capability, or high capability terminal device, or may be referred to as a legacy (legacy) terminal device or a normal (normal) terminal device. The second-type terminal device and the first-type terminal device have the foregoing distinguishing features.

This application relates to PUCCH resource allocation. Currently, in an NR system, PUCCH resources are classified into a common PUCCH resource and a dedicated PUCCH resource. The common PUCCH resource is a PUCCH resource that is used by all users in a cell before the network device configures the dedicated PUCCH resource for the terminal device. The dedicated PUCCH resource is a dedicated PUCCH resource configured by the network device for the terminal device after the terminal device is in an RRC connected mode.

Currently, the network device may configure a common PUCCH resource set for the terminal device by using a system information block (SIB) 1 or RRC signaling. The common PUCCH resource set includes 16 PUCCH resources, and one terminal device uses one PUCCH resource to feed back UCI information. The network device may configure the common PUCCH resource set by indicating an index (index) of the common PUCCH resource set. For example, a current protocol predefines a relationship between the common PUCCH resource set and the index. For details, refer to Table 1.

TABLE 1

| Index | PUCCH format (format) | First occupied symbol (first symbol) | Quantity of symbols (number of symbols) | Physical resource block offset $RB_{BWP}^{offset}$ | Initial cyclic shift index set |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N_{BWP}^{size}/4]$ | {0, 3, 6, 9} |

$$N_{BWP}^{Size}$$

is a size of an initial uplink BWP including the common PUCCH resource set, that is, a quantity of included physical resource blocks (PRBs). The symbol may be an orthogonal frequency division multiplexing (OFDM) symbol or the like.

Figure 2:
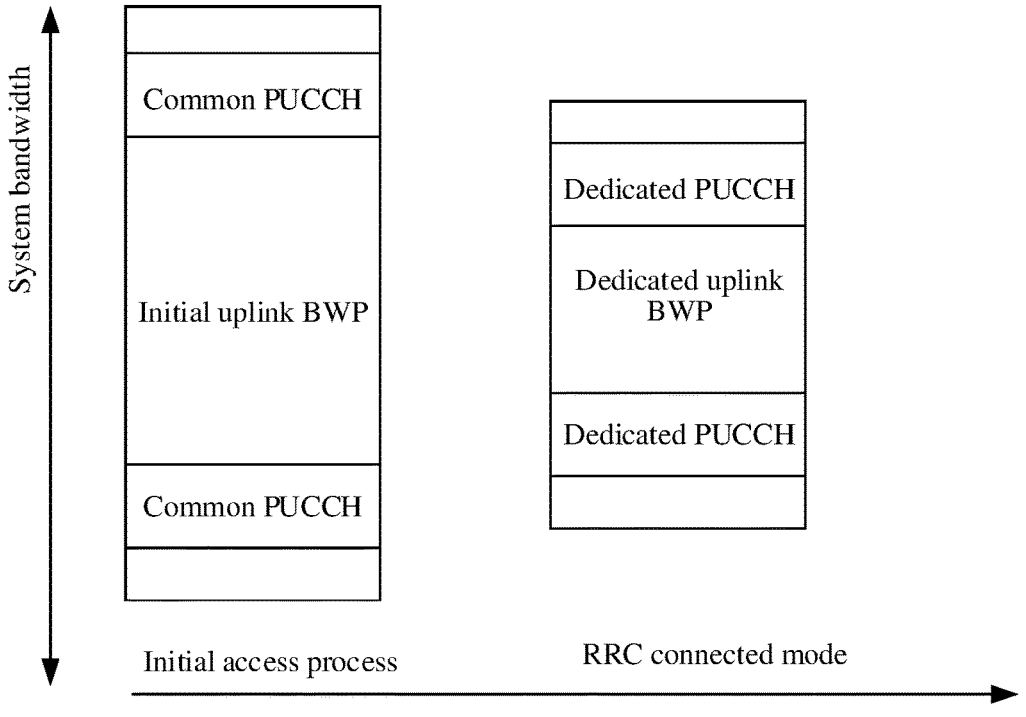
FIG. 2 is a schematic diagram of a PUCCH resource set distribution.

PUCCH resources included in the common PUCCH resource set or a dedicated PUCCH resource set are located on two sides of a BWP, and support frequency hopping (frequency hopping) transmission. The frequency hopping transmission is that a PUCCH is transmitted at different moments by using different non-contiguous frequency domain resources, to resist frequency selective fading of a radio channel, obtain a frequency diversity gain, and improve PUCCH transmission performance. Specifically, as shown in FIG. 2, the PUCCH resources included in the common PUCCH resource set are distributed on two sides of the initial uplink BWP, and the PUCCH resources included in the dedicated PUCCH resource set are also distributed on two sides of a dedicated uplink BWP. When sending the PUCCH in the common PUCCH resource set, the terminal device may determine one PUCCH resource on each of two sides of the initial uplink BWP, and send the PUCCH by using the PUCCH resources on the two sides.

It should be noted that a PUCCH resource set configured by the network device includes a plurality of PUCCH resources, and the terminal device may determine, from the PUCCH resource set in the following manners, a PRB location of a PUCCH resource for transmitting the PUCCH. If $\lfloor r_{PUCCH}/8 \rfloor = 0$, a PRB in which a PUCCH resource for a first frequency hopping transmission is located is $$RB_{BWP}^{offset} + \lfloor r_{PUCCH}/N_{CS} \rfloor;$$

and a PRB in which a PUCCH resource for a second frequency hopping transmission is located is $$N_{BWP}^{size} - 1 - RB_{BWP}^{offset} - \lfloor r_{PUCCH}/N_{CS} \rfloor.$$

If $\lfloor r_{PUCCH}/8 \rfloor = 1$,
a PRB in which a PUCCH resource for a first frequency hopping transmission is located is $$N_{BWP}^{size} - 1 - RB_{BWP}^{offset} - \lfloor (r_{PUCCH} - 8)/N_{CS} \rfloor;$$

and
a PRB in which a PUCCH resource for a second frequency hopping transmission is located is $$RB_{BWP}^{offset} + \lfloor (r_{PUCCH} - 8)/N_{CS} \rfloor.$$

$$N_{BWP}^{Size}$$

is a size of the initial uplink BWP. Values of $$RB_{BWP}^{offset}$$

and Ncs are determined based on a current common PUCCH resource configuration. $\lfloor \ \rfloor$ is a rounding-down operation. $r_{PUCCH}$ may be determined according to the following formula:

$$r_{PUCCH} = \left\lfloor \frac{2 \cdot n_{CCE,0}}{N_{CCE}} \right\rfloor + 2 \cdot \Delta_{PRI}, \ 0 \le r_{PUCCH} \le 15.$$

$N_{CCE}$ is a total quantity of control channel elements (CCEs) included in a control resource set (CORESET) for receiving a physical downlink control channel (PDCCH), $n_{CCE,0}$ is a first CCE index of the received PDCCH, and $\Delta_{PRI}$ is a value indicated by a PUCCH resource indicator field in downlink control information (DCI) carried by the PDCCH. The PDCCH is for scheduling a physical downlink shared channel (PDSCH). The terminal device needs to transmit feedback information such as a hybrid automatic repeat request-acknowledgment (hybrid automatic retransmission quest-acknowledgement, HARQ-ACK) or a hybrid automatic repeat request negative acknowledgment (hybrid automatic retransmission quest-negative acknowledgement, HARQ-NACK) for the PDSCH through a PUCCH.

Figure 3:
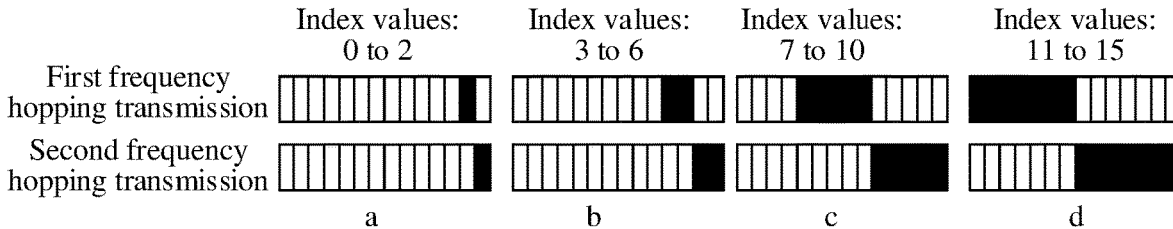
FIG. 3 is a schematic diagram of a symbol occupied by a frequency hopping transmission.

Further, symbols occupied by the PUCCH may be shown in FIG. 3. A in FIG. 3 is a schematic diagram of a symbol occupied by a PUCCH when an index of a PUCCH resource set is 0 to 2. In this case, during the first frequency hopping transmission, the PUCCH occupies the $2^{nd}$ to last symbol of one slot; and during the second frequency hopping transmission, the PUCCH occupies the last symbol of one slot.

B in FIG. 3 is a schematic diagram of symbols occupied by a PUCCH when an index of a PUCCH resource set is 3 to 6. In this case, during the first frequency hopping transmission, the PUCCH occupies the $3^{rd}$ to last symbol and the $4^{th}$ to last symbol of one slot; and during the second frequency hopping transmission, the PUCCH occupies the last two symbols of one slot.

C in FIG. 3 is a schematic diagram of symbols occupied by a PUCCH when an index of a PUCCH resource set is 7 to 10. In this case, during the first frequency hopping transmission, the PUCCH occupies the $5^{th}$ to the $9^{th}$ symbols of one slot; and during the second frequency hopping transmission, the PUCCH occupies the last five symbols of one slot.

D in FIG. 3 is a schematic diagram of symbols occupied by a PUCCH when an index of a PUCCH resource set is 11 to 15. In this case, during the first frequency hopping transmission, the PUCCH occupies the $1^{st}$ to the $7^{th}$ symbols of one slot; and during the second frequency hopping transmission, the PUCCH occupies the last seven symbols of one slot.

The PUCCH resource set described above, and locations of the PRB and the symbol occupied by the PUCCH during PUCCH transmission are all applicable to a case in which a maximum bandwidth of the initial uplink BWP and a maximum bandwidth of the dedicated uplink BWP can be configured to 100 MHz. When a terminal device is the first-type terminal device, a supported maximum bandwidth is less than 100 MHz. In this case, if the PUCCH is still transmitted in the foregoing manner, a frequency hopping range exceeds the maximum bandwidth supported by the terminal device when the PUCCH is transmitted through frequency hopping. As a result, a problem occurs during PUCCH transmission. Therefore, this application provides a PUCCH resource set configuration method, to resolve the foregoing problem. The following provides detailed descriptions.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

In embodiments of this application, interaction between the terminal device and the network device is used as an example for description. The method provided in embodiments of this application may be further applicable to interaction between other execution bodies, for example, interaction between a chip or a module in the terminal device and a chip or a module in the network device. When the execution body is a chip or a module, refer to the descriptions in embodiments of this application. Details are not described herein again.

Figure 4:
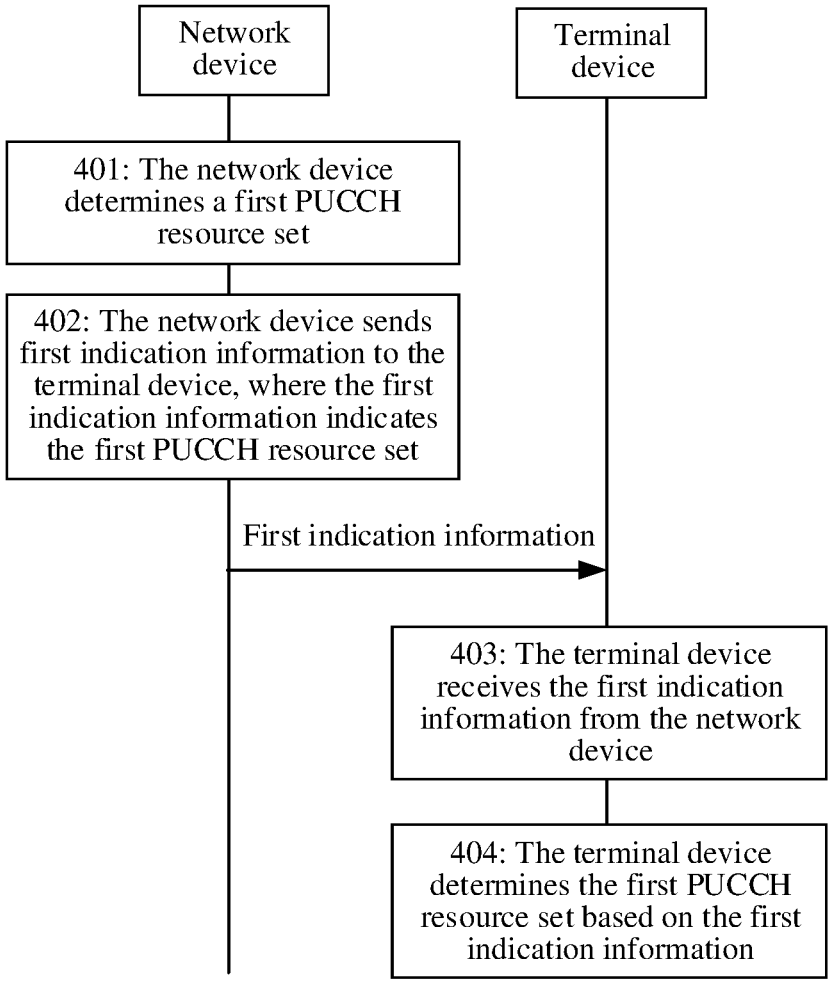
FIG. 4 is a schematic flowchart of a communication method according to an embodiment of this application.

With reference to the foregoing descriptions, FIG. 4 is a schematic flowchart of a resource configuration method according to an embodiment of this application. Refer to FIG. 4. The method includes the following steps.

S401: A network device determines a first PUCCH resource set.

How the network device specifically determines the first PUCCH resource set is not limited in this embodiment of this application. Details are not described herein.

S402: The network device sends first indication information to a terminal device, where the first indication information indicates the first PUCCH resource set.

The network device may send the first indication information by using a SIB 1 or RRC signaling, or may send the first indication information in another manner. Examples are not described one by one herein.

S403: The terminal device receives the first indication information from the network device.

S404: The terminal device determines the first PUCCH resource set based on the first indication information.

The first PUCCH resource set is the same as a second PUCCH resource set, the first PUCCH resource set is different from a second PUCCH resource set, or the first PUCCH resource set is partially the same as a second PUCCH resource set.

In this embodiment of this application, the first PUCCH resource set includes at least one PUCCH resource, and the first PUCCH resource set is configured for a first-type terminal device. The second PUCCH resource set includes at least one PUCCH resource, and the second PUCCH resource set is configured for a second-type terminal device. A maximum bandwidth supported by the first-type terminal device is less than a maximum bandwidth supported by the second-type terminal device. In this application, the terminal device may be the first-type terminal device or the second-type terminal device.

The first PUCCH resource set and the second PUCCH resource set may be common PUCCH resource sets, or may be dedicated PUCCH resource sets. The following uses the common PUCCH resource set as an example for description.

The foregoing describes how the network device configures the first PUCCH resource set for the terminal device. Because the first PUCCH resource set includes the at least one PUCCH resource, before transmitting a PUCCH, the terminal device further needs to determine a PUCCH resource from the first PUCCH resource set based on an indication of the network device.

Specifically, the network device may further send second indication information to the terminal device, where the second indication information is used by the terminal device to determine one PUCCH resource in the first PUCCH resource set. The second indication information may be carried in DCI, or may be carried in other signaling. This is not limited in this application.

Correspondingly, the terminal device may transmit the PUCCH on the PUCCH resource indicated by the second indication information. The PUCCH may carry uplink control information. The uplink control information includes but is not limited to information such as a HARQ-ACK, a HARQ-NACK, channel state information (channel state information, CSI), and a scheduling request (scheduling request, SR) of a PDSCH.

Implementation 1: The First PUCCH Resource Set is the Same as the Second PUCCH Resource Set.

Figure 5:
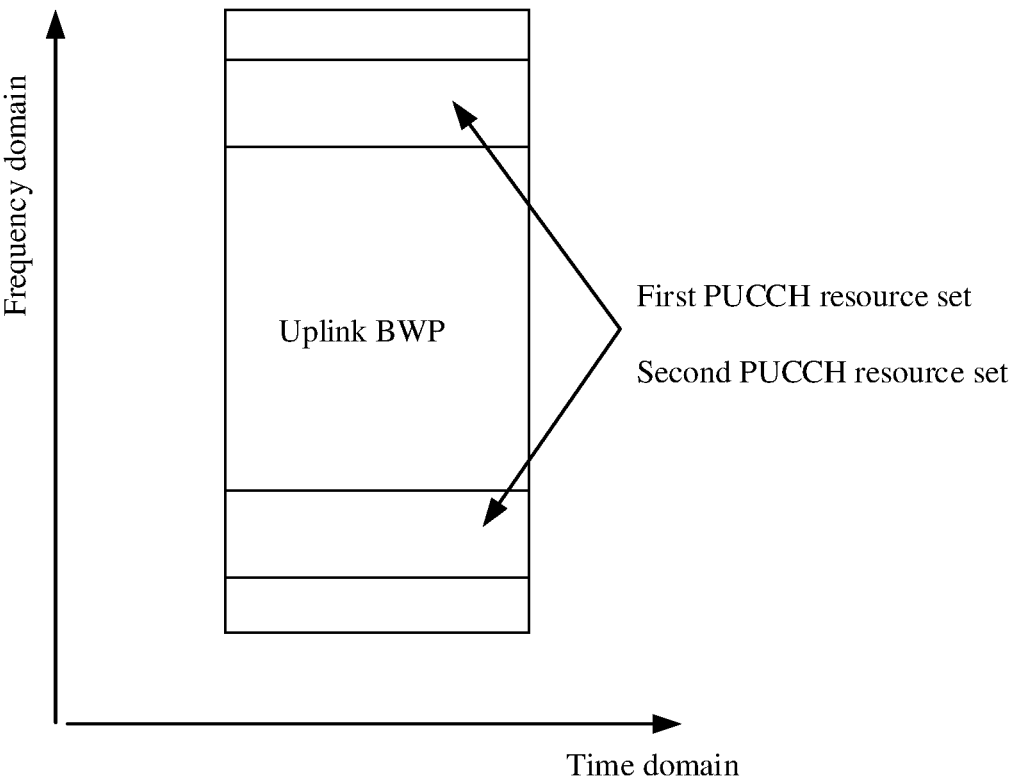
FIG. 5 is a schematic diagram of a PUCCH resource set distribution according to an embodiment of this application.

In this implementation, a time domain resource of the first PUCCH resource set is the same as a time domain resource of the second PUCCH resource set, a frequency domain resource of the first PUCCH resource set is the same as a frequency domain resource of the second PUCCH resource set, and a code domain resource of the first PUCCH resource set is the same as a code domain resource of the second PUCCH resource set. The code domain resource of the PUCCH resource set is an orthogonal sequence resource for PUCCH transmission. In this application, the time domain resource, the frequency domain resource, or the code domain resource of the first PUCCH resource set or the second PUCCH resource set is a set of time domain resources, frequency domain resources, or code domain resources occupied by all PUCCH resources included in the first PUCCH resource set or the second PUCCH resource set. In this implementation, locations of the first PUCCH resource set and the second PUCCH resource set overlap in frequency domain and time domain. For details, refer to FIG. 5. It should be noted that overlapping in frequency domain indicates that a sum of all PUCCH resources in the first PUCCH resource set in frequency domain is the same as a sum of all PUCCH resources in the second PUCCH resource set in frequency domain, and does not indicate that single PUCCH resources need to be the same in frequency domain.

In this implementation, the first indication information may indicate both the first PUCCH resource set and the second PUCCH resource set. In other words, because the first PUCCH resource set is the same as the second PUCCH resource set, the network device may configure a same PUCCH resource set for both the first-type terminal device and the second-type terminal device by using one piece of signaling. This improves resource utilization.

In this implementation, the first indication information may include an index of the first PUCCH resource set, for example, the index shown in the first column in Table 1. The index may indicate parameters such as a PUCCH format, a start symbol, a quantity of included symbols, a physical resource block $$RB_{BWP}^{offset},$$

an initial cyclic interval set $N_{CS}$ of the PUCCH resource in the first PUCCH resource set, and a size $$N_{BWP}^{Size}$$

of a first initial uplink bandwidth part in which the first PUCCH resource set is located.

Alternatively, the first indication information may not include an index, but includes at least one parameter described above.

In this implementation, the network device may indicate, by using the second indication information, the PUCCH resource used by the terminal device to send the PUCCH. In a specific implementation, the second indication information may be sent by using DCI.

Specifically, a PUCCH resource indicator field in the DCI may carry a value of a parameter $\Delta_{PRI}$, so that the terminal device may determine $r_{PUCCH}$ based on $\Delta_{PRI}$. For details, refer to the foregoing descriptions. Details are not described herein again.

Further, the terminal device may determine, from the first PUCCH resource set in the following manners, a PRB location of a PUCCH resource for transmitting the PUCCH.

If $\lfloor r_{PUCCH}/8 \rfloor = 0$,
a PRB in which a PUCCH resource for a first frequency hopping transmission is located is $$RB_{BWP}^{offset} + \lfloor r_{PUCCH}/N_{CS} \rfloor;$$

and
a PRB in which a PUCCH resource for a second frequency hopping transmission is located is $$N_{BWP}^{size} - 1 - RB_{BWP}^{offset} - \lfloor r_{PUCCH}/N_{CS} \rfloor.$$

If $\lceil r_{PUCCH}/8 \rceil = 1$,
a PRB in which a PUCCH resource for a first frequency hopping transmission is located is $$N_{BWP}^{size} - 1 - RB_{BWP}^{offset} - \lfloor (r_{PUCCH} - 8)/N_{CS} \rfloor;$$

and
a PRB in which a PUCCH resource for a second frequency hopping transmission is located is $$RB_{BWP}^{offset} + \lfloor (r_{PUCCH} - 8)/N_{CS} \rfloor.$$

Values of $$N_{BWP}^{Size}, RB_{BWP}^{offset},$$

and Ncs are determined based on the first indication information.

In this implementation, if the terminal device is the first-type terminal device, when a bandwidth of an initial uplink BWP in which the first PUCCH resource set is currently located or a frequency domain range of two adjacent frequency hopping transmissions in the first PUCCH resource set is greater than a maximum bandwidth supported by the terminal device, the terminal device needs to perform radio frequency retuning between the two frequency hopping transmissions. During the radio frequency retuning, the terminal device cannot normally perform an uplink control information sending process. Therefore, X symbols in a time domain resource in which the first PUCCH resource set is located are not for transmitting a PUCCH, where X is a positive integer, X is less than Y, and Y is a quantity of symbols occupied by the first PUCCH resource set. A value of X may be related to a capability of the terminal device.

It should be noted that, duration in which PUCCH transmission cannot be performed due to the radio frequency retuning may also be referred to as an interval (gap), radio frequency retuning duration, or the like. In other words, the radio frequency retuning duration includes X symbols. The frequency domain range of the two adjacent frequency hopping transmissions is a frequency domain range from an index of the lowest resource of the first PUCCH resource set to an index of the highest resource.

Optionally, in this embodiment of this application, a start location of the radio frequency retuning may be determined in a plurality of manners. In a possible implementation, the start location of the radio frequency retuning may be a start location of the second frequency hopping transmission.

In another possible implementation, when the index of the first PUCCH resource set is 0 to 6, or the quantity of symbols occupied by the first PUCCH resource set is less than or equal to a first threshold, the start location of the radio frequency retuning may be a start location of the second frequency hopping transmission. When the index of the first PUCCH resource set is 7 to 15, or the quantity of symbols occupied by the first PUCCH resource set is greater than the first threshold, the start location of the radio frequency retuning may be a start location of the $H^{th}$ to last symbol for the first frequency hopping transmission. H is an integer greater than 0. The first threshold may be determined based on an actual situation. For example, the first threshold may be equal to 4.

Figure 6:
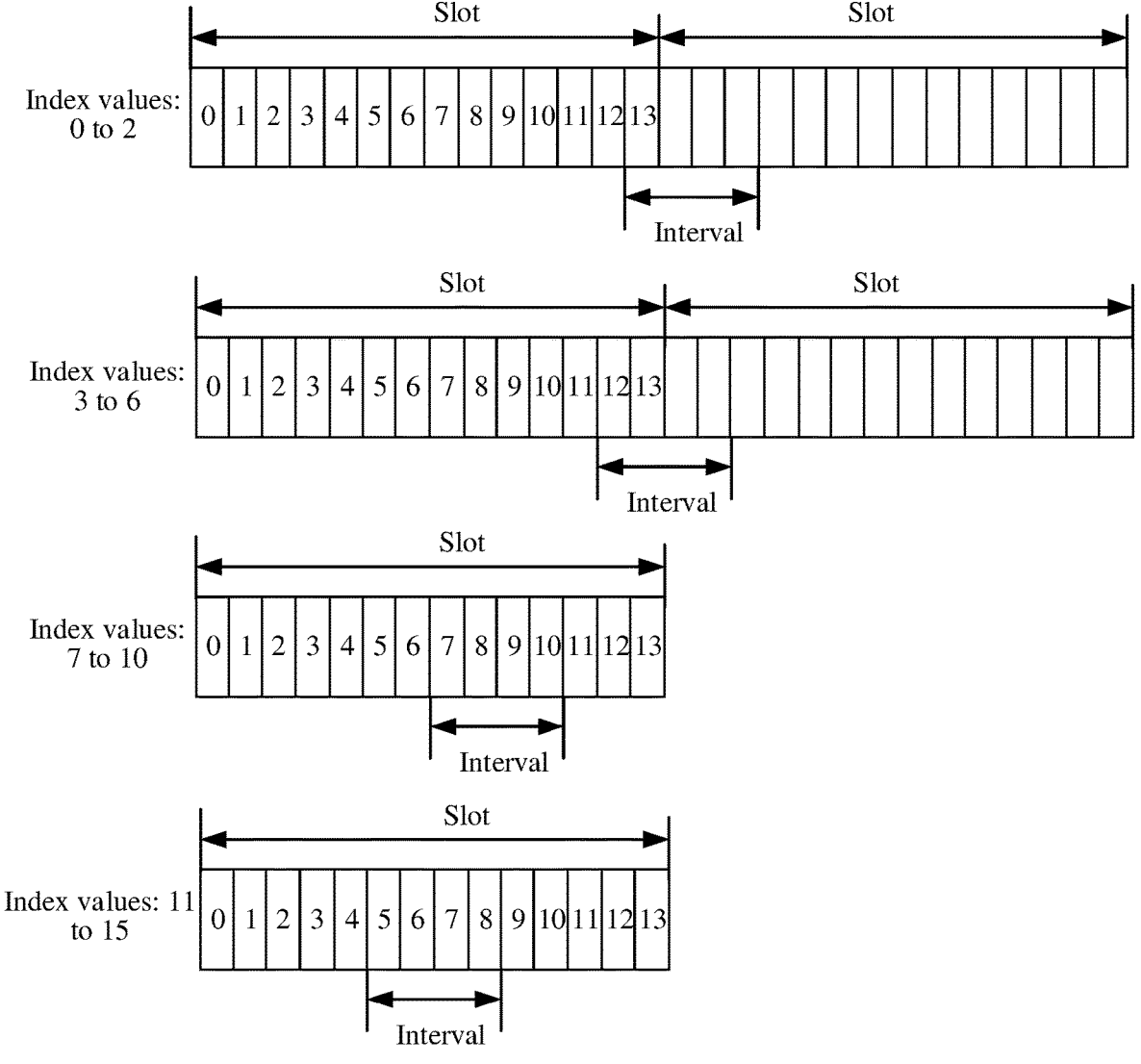
FIG. 6 is a schematic diagram of an interval between two frequency hopping transmissions according to an embodiment of this application.

For example, as shown in FIG. 6, X=4 and H=2 are used as an example in FIG. 6. One symbol includes 14 symbols: a symbol 0 to a symbol 13. When the index of the first PUCCH resource set is 0 to 2, the first frequency hopping transmission occupies the $2^{nd}$ to last symbol of one slot, and the second frequency hopping transmission occupies the last symbol of one slot. The start location of the radio frequency retuning is a start location of the last symbol of the slot. Because all symbols occupied by the second frequency hopping transmission are within the radio frequency retuning duration, only the first frequency hopping transmission is performed, and the second frequency hopping transmission is not performed. When the index of the first PUCCH resource set is 3 to 6, the second frequency hopping transmission occupies the last two symbols of one slot, and the start location of the radio frequency retuning is a start location of the $2^{nd}$ to last symbol of the slot. Because all symbols occupied by the second frequency hopping transmission are within the radio frequency retuning duration, only the first frequency hopping transmission is performed, and the second frequency hopping transmission is not performed.

When the index of the first PUCCH resource set is 7 to 10, the first frequency hopping transmission occupies a symbol 4 to a symbol 8 of one slot, and the second frequency hopping transmission occupies a symbol 9 to a symbol 13 of one slot. The start location of the radio frequency retuning is a start location of the $7^{th}$ symbol (symbol 6) of the slot. Because the last two symbols occupied by the first frequency hopping transmission and the first two symbols occupied by the second frequency hopping transmission are all within the radio frequency retuning duration, the first frequency hopping transmission actually occupies the symbol 4 and the symbol 5, and the second frequency hopping transmission actually occupies the symbol 12 and the symbol 13. When the index of the first PUCCH resource set is 11 to 15, the first frequency hopping transmission occupies a symbol 0 to a symbol 6 of one slot, and the second frequency hopping transmission occupies a symbol 7 to a symbol 13 of one slot. The start location of the radio frequency retuning is a start location of the $5^{th}$ symbol (symbol 4) of the slot. Therefore, the first frequency hopping transmission actually occupies the symbol 0 to the symbol 4, and the second frequency hopping transmission actually occupies the symbol 9 to the symbol 13.

Optionally, some PUCCH resources cannot be used for transmission due to the radio frequency retuning. Consequently, PUCCH transmission performance deteriorates. To enhance PUCCH performance, a PUCCH may be repeatedly transmitted in a plurality of slots, and frequency hopping is performed on the PUCCH repeatedly transmitted in different slots, to obtain a frequency diversity gain. In an implementation method, whether repeated transmission is performed on an included PUCCH resource and/or a quantity of repeated transmissions are/is predefined in pre-configuration information of the first PUCCH resource set or the second PUCCH resource set. The terminal determines, based on the first indication information sent by the base station, whether PUCCH repeated transmission is performed and/or a quantity of PUCCH repeated transmissions. In another implementation method, the base station dynamically indicates, by using DCI, whether the terminal performs PUCCH repeated transmission and/or a quantity of PUCCH repeated transmissions. The DCI and the DCI indicating the PUCCH resource may be a same piece of DCI. In other words, the DCI simultaneously indicates PUCCH repeated transmission information and the PUCCH resource.

In the implementation 1, the network device configures a same PUCCH resource set for the first-type terminal device and the second-type terminal, so that the two types of terminal devices can reuse the same PUCCH resource set, to reduce PUCCH resource overheads in a network or a cell, and improve resource utilization in the network or the cell. In addition, for the first-type terminal device, when a PUCCH resource frequency hopping range exceeds the maximum bandwidth of the terminal and radio frequency retuning needs to be performed, a start time point or a time domain location of the radio frequency retuning is defined to ensure PUCCH transmission performance of the first-type terminal as much as possible, and impact on PUCCH transmission of the second-type terminal is reduced as much as possible.

Implementation 2: The First PUCCH Resource Set is Different from the Second PUCCH Resource Set.

Figure 7:
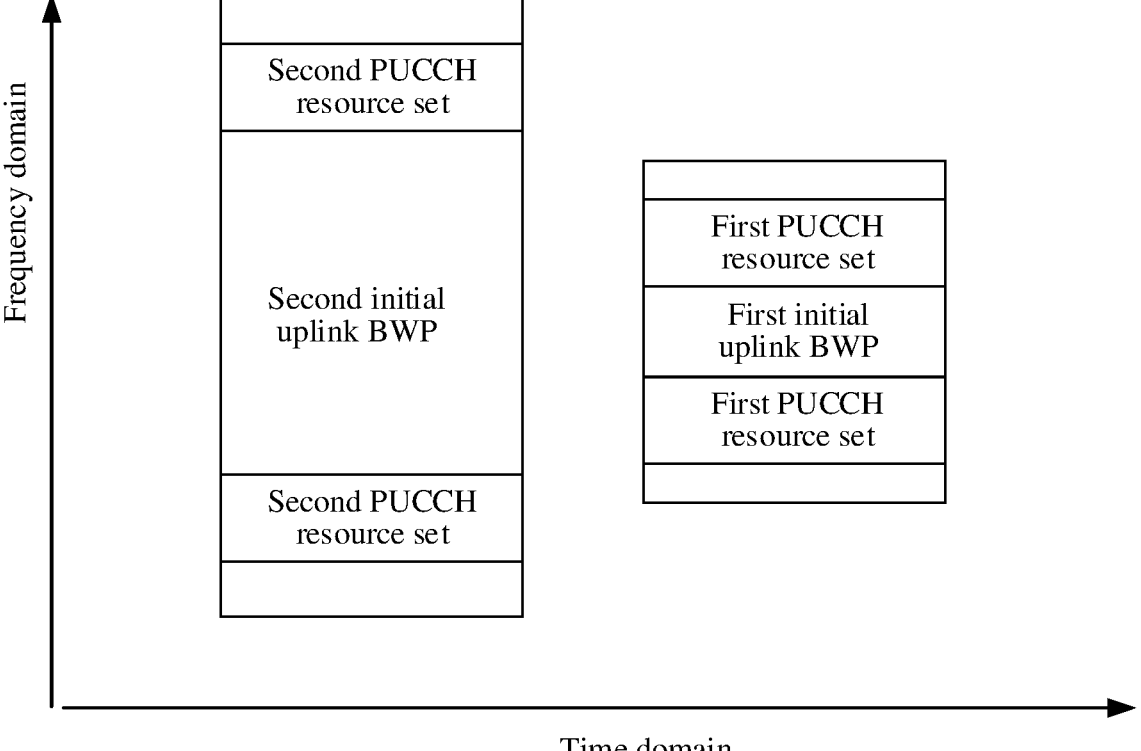
FIG. 7 is a schematic diagram of a PUCCH resource set distribution according to an embodiment of this application.

In a first scenario, as shown in FIG. 7, the network device may configure a first initial uplink BWP for the first-type terminal device, and configure a second initial uplink BWP for the second-type terminal device. The first initial uplink BWP may be located in a frequency domain range of the second initial uplink BWP, or may not be located in the frequency domain range of the second initial uplink BWP. This is not limited in this application.

The first PUCCH resource set is located in a frequency domain range of the first initial uplink BWP. Correspondingly, the second PUCCH resource set is located in the frequency domain range of the second initial uplink BWP.

In this scenario, a bandwidth of the first initial uplink BWP may be less than or equal to the maximum bandwidth supported by the first-type terminal device. According to this method, when a terminal device transmits a PUCCH in the first PUCCH resource set, a frequency domain range of two adjacent frequency hopping transmissions can be less than or equal to a maximum bandwidth supported by the terminal device, to avoid a performance loss of PUCCH transmission.

It should be noted that, in this scenario, for a specific implementation of the first indication information, refer to descriptions in the foregoing implementation 1. Details are not described herein again. For how the terminal device specifically determines the first PUCCH resource set, and determines, in the first PUCCH resource set, a PUCCH resource for transmission and a start location of a PRB for each frequency hopping transmission, refer to the descriptions in the foregoing implementation 1. Details are not described herein again.

Figure 8:
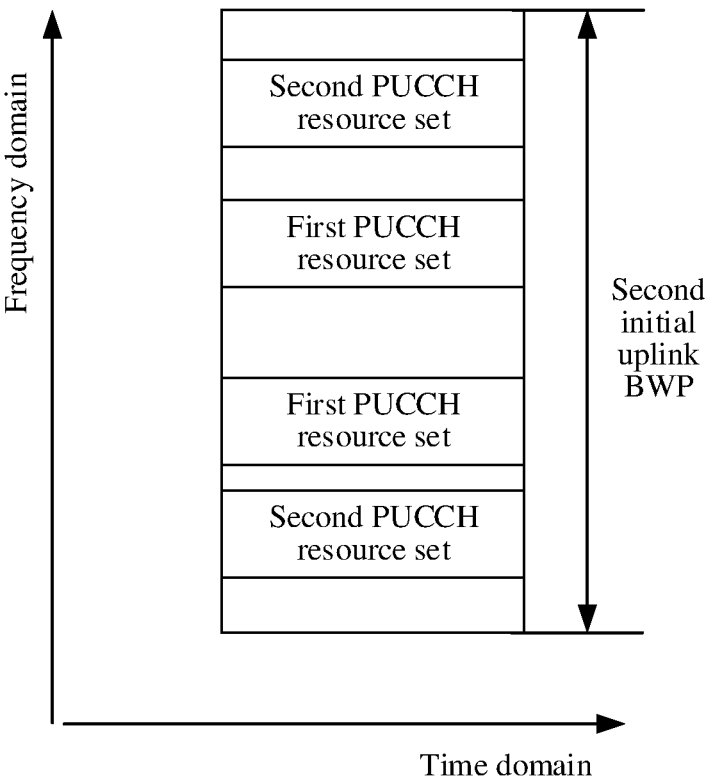
FIG. 8 is a schematic diagram of a PUCCH resource set distribution according to an embodiment of this application.

In a second scenario, as shown in FIG. 8, the network device may configure a second initial uplink BWP for the second-type terminal device. Both the first PUCCH resource set and the second PUCCH resource set are located in a frequency domain range of the second initial uplink BWP.

It should be noted that, in this scenario, in addition to at least one of parameters such as an index of the first PUCCH resource set, a PUCCH format, a start symbol, a quantity of included symbols, a physical resource block offset $$RB_{BWP}^{offset},$$

an initial cyclic interval set $N_{CS}$ of the PUCCH resource in the first PUCCH resource set, and a size $$N_{BWP}^{Size}$$

of a first initial uplink bandwidth part, the first indication information may further include at least one of the following:

a frequency domain location $$RB_{start}^{first}$$

that is in the first PUCCH resource set and at which the terminal device performs the first frequency hopping transmission; and a frequency domain location $$RB_{start}^{second}$$

that is in the first PUCCH resource set and at which the terminal device performs the second frequency hopping transmission.

Further, in an implementation, the network device may indicate, by using the second indication information, the terminal device to transmit a PUCCH by using one PUCCH resource in the first PUCCH resource set. In a specific implementation, the second indication information may be sent by using DCI. Specifically, a PUCCH resource indicator field in the DCI may carry a value of a parameter $\Delta_{PRI}$, so that the terminal device may determine $r_{PUCCH}$ based on $\Delta_{PRI}$. For details, refer to the foregoing descriptions. Details are not described herein again.

With reference to the foregoing descriptions, in this scenario, the terminal device may determine, in the following manners, a PRB location of a PUCCH resource for transmission.

If $[r_{PUCCH}/8]=0$, a PRB for PUCCH transmission in first frequency hopping is $$RB_{start}^{first} + \lfloor r_{PUCCH}/N_{CS} \rfloor;$$

and a PRB for PUCCH transmission in second frequency hopping is $$RB_{start}^{second} - \lfloor r_{PUCCH}/N_{CS} \rfloor;$$

and if $[r_{PUCCH}/8]=1$, a PRB for PUCCH transmission in first frequency hopping is $$RB_{start}^{second} + \lfloor (r_{PUCCH} - 8)/N_{CS} \rfloor;$$

and a PRB for PUCCH transmission in second frequency hopping is $$RB_{start}^{first} - \lfloor (r_{PUCCH} - 8)/N_{CS} \rfloor.$$

In this implementation, a frequency domain range of the first PUCCH resource set may be less than or equal to the maximum bandwidth supported by the first-type terminal device. If the frequency domain range of the first PUCCH resource set is greater than the maximum bandwidth supported by the first-type terminal device, the terminal device needs to perform radio frequency retuning between two frequency hopping transmissions that are performed in the first PUCCH resource set. For specific content, refer to descriptions in the implementation 1. Details are not described herein again.

In this implementation, a frequency domain resource of the first PUCCH resource set does not overlap a frequency domain resource of the second PUCCH resource set. Optionally, the frequency domain resource of the first PUCCH resource set and the frequency domain resource of the second PUCCH resource set are partially contiguous.

Figure 9:
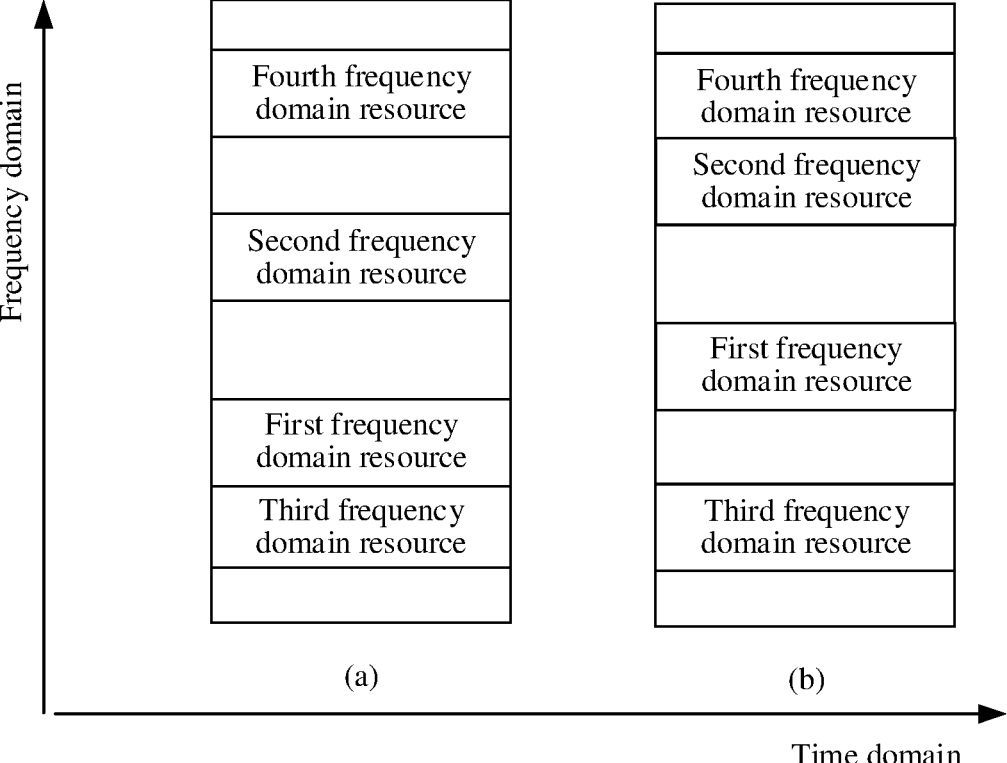
FIG. 9 is a schematic diagram of a PUCCH resource set distribution according to an embodiment of this application.

For example, as shown in FIG. 9, the frequency domain resource of the first PUCCH resource set includes a first frequency domain resource and a second frequency domain resource, and the frequency domain resource of the second PUCCH resource set includes a third frequency domain resource and a fourth frequency domain resource. A location index of the first frequency domain resource is less than a location index of the second frequency domain resource, and a location index of the third frequency domain resource is less than a location index of the fourth frequency domain resource. As shown in (a) in FIG. 9, the first frequency domain resource is contiguous to the third frequency domain resource. Alternatively, as shown in (b) in FIG. 9, the second frequency domain resource is contiguous to the fourth frequency domain resource.

Optionally, in this implementation, a center frequency of a radio frequency link of the terminal device is determined based on a PUCCH resource in the first PUCCH resource set that is determined to be used. For example, when the terminal device determines to use a PUCCH resource in the first PUCCH resource set for transmission, the center frequency of the radio frequency link of the terminal may be adjusted or set to a center frequency of a frequency domain resource of the PUCCH resource. It should be noted that, in a PUCCH transmission process, the center frequency of the radio frequency link of the terminal device is set to a center frequency of a frequency domain range of the PUCCH resource used for transmission, and in an uplink transmission process of an entire random access process, for a physical random access channel (physical random access channel, PRACH), a message 3, and the like, the center frequency of the radio frequency link of the terminal device may also be set to a center frequency of a frequency domain resource for a channel to be sent.

It should be noted that the radio frequency link may include a radio frequency receive channel and a radio frequency transmit channel. The radio frequency receive channel may receive a radio frequency signal through an antenna, perform processing (such as amplification, filtering, and down-conversion) on the radio frequency signal to obtain a baseband signal, and transfer the baseband signal to a baseband chip. The radio frequency transmit channel may receive a baseband signal from the baseband chip, perform radio frequency processing (such as up-conversion, amplification, and filtering) on the baseband signal to obtain a radio frequency signal, and finally radiate the radio frequency signal into space through an antenna. Specifically, the radio frequency link may include electronic components such as an antenna switch, an antenna tuner, a low noise amplifier (LNA), a power amplifier (PA), a mixer (mixer), a local oscillator (LO), and a filter (filter). These components may be integrated into one or more chips based on a requirement. The antenna may also be considered as a part of the radio frequency link sometimes.

In the implementation 2, the network device configures different PUCCH resource sets for the first-type terminal device and the second-type terminal, so that a PUCCH resource capacity is expanded, to support more users in accessing the network device. In addition, different PUCCH resource sets are configured for the first-type terminal device, so that it can be ensured that when the first-type terminal device transmits a PUCCH, a frequency domain range of frequency hopping transmission does not exceed the maximum bandwidth supported by the first-type terminal device. This ensures that PUCCH transmission performance of the first-type terminal does not deteriorate, and reduces impact on PUCCH transmission of the second-type terminal as much as possible. In addition, preferably, some frequency domain resources of the first PUCCH resource set and the second PUCCH resource set are configured or predefined to be contiguous, so that network or cell resource fragmentation caused by PUCCH resources is effectively decreased or reduced, and network resource utilization is improved.
Implementation 3: The First PUCCH Resource Set is Partially the Same as the Second PUCCH Resource Set.

There are at least two cases in this implementation. In a first case, the frequency domain resource of the first PUCCH resource set includes a first frequency domain resource and a second frequency domain resource, and the frequency domain resource of the second PUCCH resource set includes a third frequency domain resource and a fourth frequency domain resource.

Figure 10:
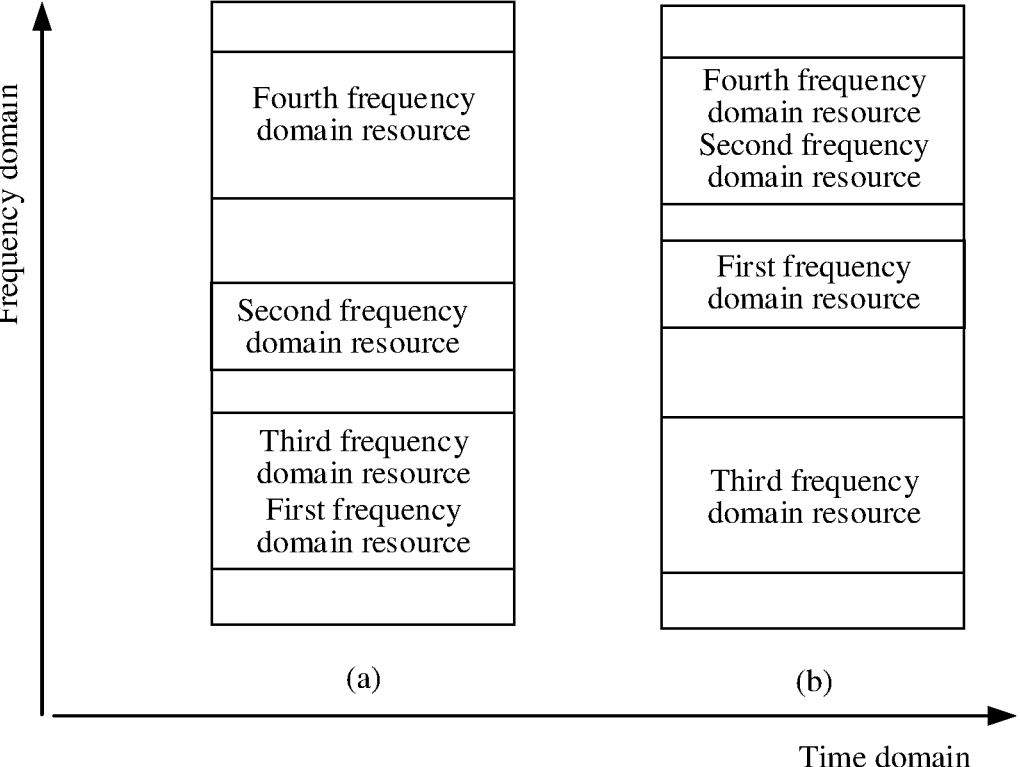
FIG. 10 is a schematic diagram of a PUCCH resource set distribution according to an embodiment of this application.

As shown in FIG. 10, that the first PUCCH resource set is partially the same as the second PUCCH resource set may be that the first frequency domain resource of the first PUCCH resource set is the same as the third frequency domain resource of the second PUCCH resource set, and the second frequency domain resource of the first PUCCH resource set is different from the fourth frequency domain resource of the second PUCCH resource set, which corresponds to (a) in FIG. 10. Alternatively, that the first PUCCH resource set is partially the same as the second PUCCH resource set may be that the first frequency domain resource of the first PUCCH resource set is different from the third frequency domain resource of the second PUCCH resource set, and the second frequency domain resource of the first PUCCH resource set is the same as the fourth frequency domain resource of the second PUCCH resource set, which corresponds to (b) in FIG. 10.

In this case, the first PUCCH resource set and the second PUCCH resource set may be located in a frequency domain range of a same initial uplink BWP, for example, both are located in a frequency domain range of a second initial uplink BWP.

In this case, for a specific implementation of the first indication information, refer to the descriptions in the foregoing implementation 1. Details are not described herein again. For how the terminal device specifically determines the first PUCCH resource set, and determines, in the first PUCCH resource set, a start location of a PRB for each frequency hopping transmission, refer to the descriptions in the foregoing implementation 1. Details are not described herein again.

In this case, the first PUCCH resource set and the second PUCCH resource set may alternatively be located in frequency domain ranges of different initial uplink BWPs. For example, the first PUCCH resource set is located in a frequency domain range of a first initial uplink BWP, and the second PUCCH resource set is located in a frequency domain range of a second initial uplink BWP.

In this case, for a specific implementation of the first indication information, refer to the descriptions in the foregoing implementation 1. Details are not described herein again.

Further, in an implementation, the network device may indicate, by using the second indication information, the terminal device to transmit a PUCCH by using one PUCCH resource in the first PUCCH resource set. In a specific implementation, the second indication information may be sent by using DCI. Specifically, a PUCCH resource indicator field in the DCI may carry a value of a parameter $\Delta_{PRI}$, so that the terminal device may determine $r_{PUCCH}$ based on $\Delta_{PRI}$. For details, refer to the foregoing descriptions. Details are not described herein again.

With reference to the foregoing descriptions, in this case, the terminal device may determine, in the following manners, a PRB location of a PUCCH resource for transmission.
If $\lfloor r_{PUCCH}/8 \rfloor = 0$,
a PRB for PUCCH transmission in first frequency hopping is $$RB_{BWP}^{offset} + \lfloor r_{PUCCH}/N_{CS} \rfloor;$$

and
a PRB for PUCCH transmission in second frequency hopping is $$\min(N_{BWP}^{Size}, \text{UE\_BW}) - 1 - RB_{BWP}^{offset} - \lfloor r_{PUCCH}/N_{CS} \rfloor;$$

and
if $\lfloor r_{PUCCH}/8 \rfloor = 1$,
a PRB for PUCCH transmission in first frequency hopping is $$\min(N_{BWP}^{Size}, \text{UE\_BW}) - 1 - RB_{BWP}^{offset} - \lfloor (r_{PUCCH} - 8)/N_{CS} \rfloor;$$

and
a PRB for PUCCH transmission in second frequency hopping is $$RB_{BWP}^{offset} - \lfloor (r_{PUCCH} - 8)/N_{CS} \rfloor.$$

UE_BW is a maximum bandwidth supported by the terminal device, and for another parameter, refer to the foregoing descriptions, where min( ) indicates a minimum value operation.

In this case, a bandwidth of the first initial uplink BWP may be less than or equal to the maximum bandwidth supported by the first-type terminal device. If the frequency domain range of the first PUCCH resource set is greater than the maximum bandwidth supported by the first-type terminal device, the terminal device needs to perform radio frequency retuning between two frequency hopping transmissions that are performed in the first PUCCH resource set. For specific content, refer to descriptions in the implementation 1. Details are not described herein again.

In a second case, a time domain resource of the first PUCCH resource set includes a first time domain resource and a second time domain resource, and a time domain resource of the second PUCCH resource set includes a third time domain resource and a fourth time domain resource. That the first PUCCH resource set is partially the same as the second PUCCH resource set is that the first time domain resource of the first PUCCH resource set is the same as the third time domain resource of the second PUCCH resource set, and the second time domain resource of the first PUCCH resource set is different from the fourth time domain resource of the second PUCCH resource set. Alternatively, that the first PUCCH resource set is partially the same as the second PUCCH resource set is that the first time domain resource of the first PUCCH resource set is different from the third time domain resource of the second PUCCH resource set, and the second time domain resource of the first PUCCH resource set is the same as the fourth time domain resource of the second PUCCH resource set.

The first time domain resource and the third time domain resource may be symbols occupied for a first frequency hopping PUCCH transmission, and the second time domain resource and the fourth time domain resource may be symbols occupied for a second frequency hopping PUCCH transmission.

Figure 11:
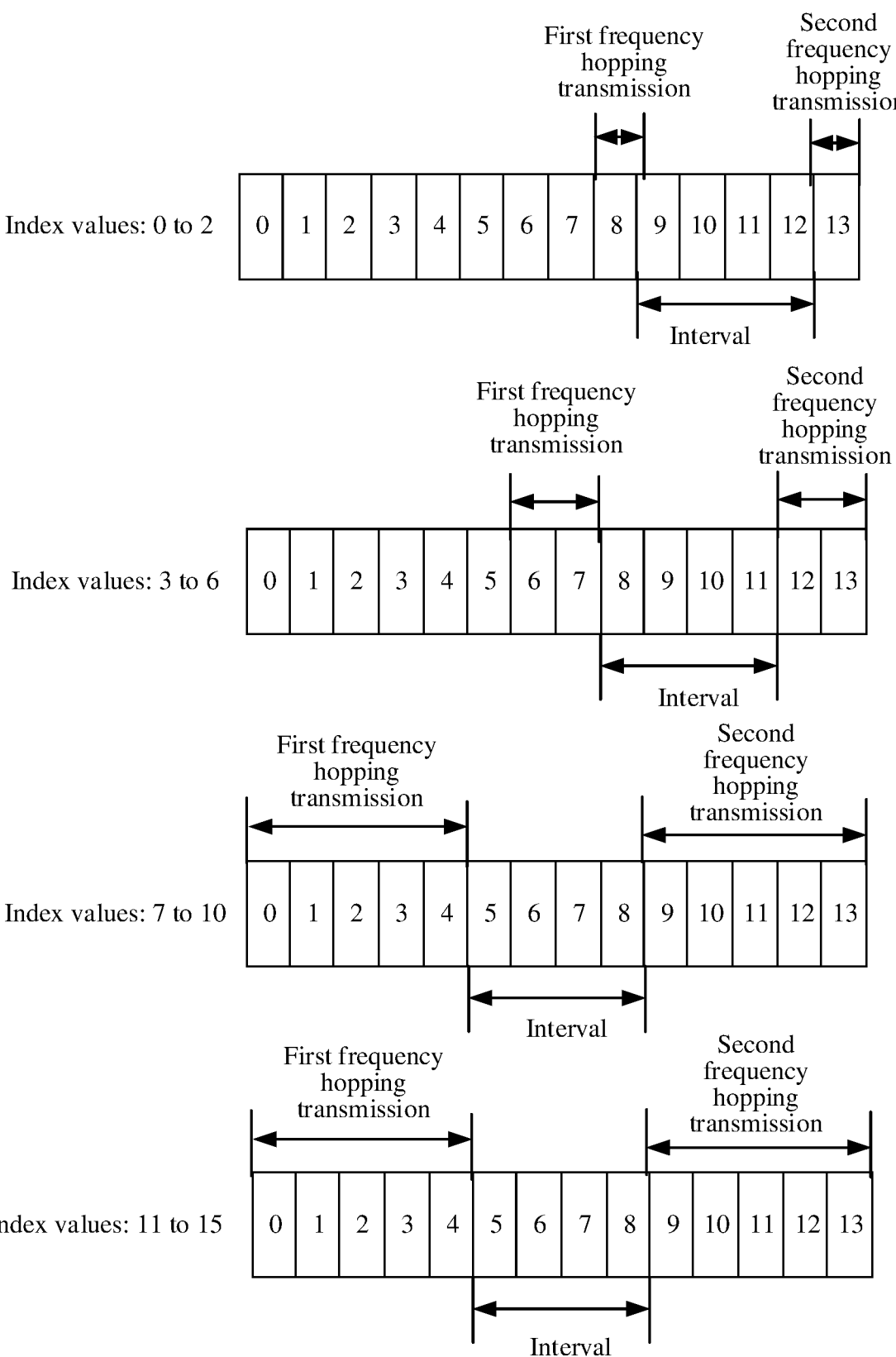
FIG. 11 is a schematic diagram of symbols occupied by a frequency hopping transmission according to an embodiment of this application.

For example, one symbol includes 14 symbols: a symbol 0 to a symbol 13. When the first time domain resource is different from the third time domain resource, and the second time domain resource is the same as the fourth time domain resource, there are a plurality of cases. For details, refer to FIG. 11. When an index of the first PUCCH resource set is 0 to 2, the first frequency hopping transmission occupies the $9^{th}$ symbol (namely, a symbol 8) of one slot, and the second frequency hopping transmission occupies the last symbol (namely, a symbol 13) of one slot. Correspondingly, when an index of the second PUCCH resource set is 0 to 2, the first frequency hopping transmission occupies the $13^{th}$ symbol (namely, a symbol 12) of one slot, and the second frequency hopping transmission occupies the last symbol (namely, a symbol 13) of one slot.

When the index of the first PUCCH resource set is 3 to 6, the first frequency hopping transmission occupies a symbol 6 and a symbol 7 of one slot, and the second frequency hopping transmission occupies the last two symbols (namely, a symbol 12 and a symbol 13) of one slot. Correspondingly, when the index of the second PUCCH resource set is 3 to 6, the first frequency hopping transmission occupies a symbol 10 and a symbol 11 of one slot, and the second frequency hopping transmission occupies the last two symbols (namely, a symbol 12 and a symbol 13) of one slot.

When the index of the first PUCCH resource set is 7 to 10, the first frequency hopping transmission occupies a symbol 0 to a symbol 4 of one slot, and the second frequency hopping transmission occupies a symbol 9 to a symbol 13 of one slot. Correspondingly, when the index of the second PUCCH resource set is 7 to 10, the first frequency hopping transmission occupies a symbol 4 to a symbol 8 of one slot, and the second frequency hopping transmission occupies a symbol 9 to a symbol 13 of one slot.

When the index of the first PUCCH resource set is 11 to 15, the first frequency hopping transmission actually occupies a symbol 0 to a symbol 4, and the second frequency hopping transmission actually occupies a symbol 9 to a symbol 13. Correspondingly, when the index of the second PUCCH resource set is 7 to 10, the first frequency hopping transmission occupies a symbol 0 to a symbol 6 of one slot, and the second frequency hopping transmission occupies a symbol 7 to a symbol 13 of one slot.

In this case, the frequency domain resource of the first PUCCH resource set overlaps the frequency domain resource of the second PUCCH resource set. In this case, if a frequency range of the first PUCCH resource set is greater than the maximum bandwidth supported by the first-type terminal device, the terminal device needs to perform radio frequency retuning when performing PUCCH frequency hopping transmission.

To prevent PUCCH transmission performance deterioration caused by PUCCH transmission interruption that is caused by radio frequency retuning, a symbol interval may be introduced between two frequency hopping transmissions. Specifically, there may be M symbols between an end location of a symbol occupied by the terminal device for the first frequency hopping transmission in the first PUCCH resource set and a start location of a symbol occupied by the terminal device for the second frequency hopping transmission in the first PUCCH resource, where M is an integer greater than 0. The M symbols are used as radio frequency retuning duration, that is, used as an interval between two frequency hopping transmissions. The M symbols are not used for data transmission.

For example, if a location of a start symbol occupied by the first frequency hopping transmission is adjusted, Table 1 may be modified to Table 2.

TABLE 2

| Index | PUCCH format (format) | Occupied start symbol | Quantity of symbols | Physical resource block offset $RB_{BWP}^{offset}$ | Initial cyclic shift index set |
|---|---|---|---|---|---|
| 0 | 0 | 12-M | 2 | 0 | {0, 3} |
| 1 | 0 | 12-M | 2 | 0 | {0, 4, 8} |
| 2 | 0 | 12-M | 2 | 3 | {0, 4, 8} |
| 3 | 1 | 10-M | 4 | 0 | {0, 6} |
| 4 | 1 | 10-M | 4 | 0 | {0, 3, 6, 9} |
| 5 | 1 | 10-M | 4 | 2 | {0, 3, 6, 9} |
| 6 | 1 | 10-M | 4 | 4 | {0, 3, 6, 9} |
| 7 | 1 | 4-M | 10 | 0 | {0, 6} |
| 8 | 1 | 4-M | 10 | 0 | {0, 3, 6, 9} |
| 9 | 1 | 4-M | 10 | 2 | {0, 3, 6, 9} |
| 10 | 1 | 4-M | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N_{BWP}^{size}/4]$ | {0, 3, 6, 9} |

Figure 12:
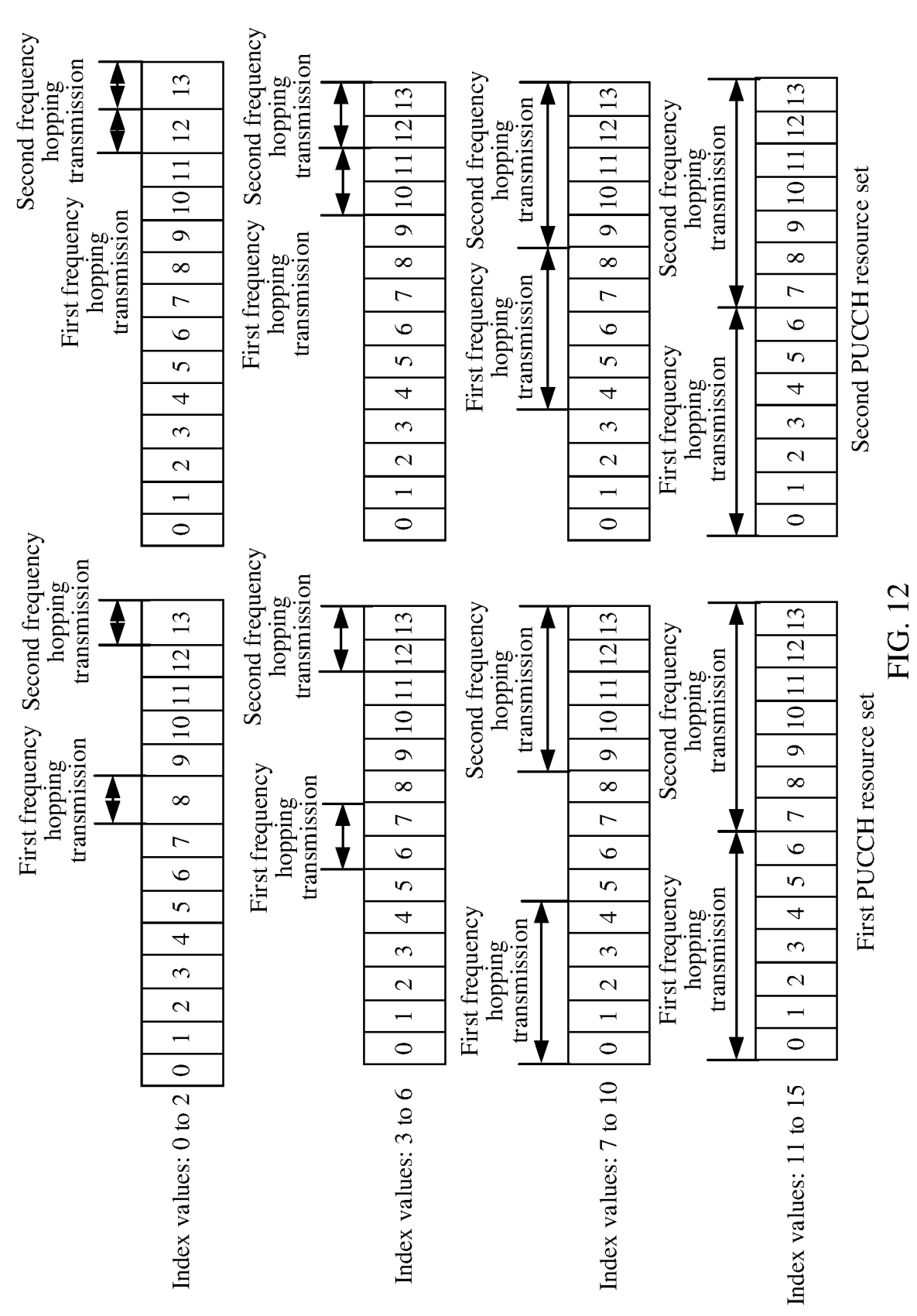
FIG. 12 is a schematic diagram of symbols occupied by a frequency hopping transmission according to an embodiment of this application.

With reference to Table 2, it is assumed that M=4. As shown in FIG. 12, one symbol includes 14 symbols: a symbol 0 to a symbol 13. When the index of the first PUCCH resource set is 0 to 2, the first frequency hopping transmission occupies the $9^{th}$ symbol (namely, a symbol 8)

of one slot, the second frequency hopping transmission occupies the last symbol (namely, a symbol 13) of one slot, and a start location of radio frequency retuning (namely, a start location of an interval between two frequency hopping transmissions) is an end location of the $9^{th}$ symbol or a start location of the $10^{th}$ symbol of the slot, and four symbols are included in total. When the index of the first PUCCH resource set is 3 to 6, the first frequency hopping transmission occupies the $7^{th}$ symbol and the $8^{th}$ symbol of one slot, namely, a symbol 6 and a symbol 7, the second frequency hopping transmission occupies the last two symbols (namely, a symbol 12 and a symbol 13) of one slot, and a start location of radio frequency retuning is an end location of the $8^{th}$ symbol of the slot or a start location of the $9^{th}$ symbol of the slot, and four symbols are included in total.

When the index of the first PUCCH resource set is 7 to 10, the first frequency hopping transmission occupies a symbol 0 to a symbol 4 of one slot, the second frequency hopping transmission occupies a symbol 9 to a symbol 13 of one slot, and a start location of radio frequency retuning is an end location of the $5^{th}$ symbol (namely, the symbol 4) of the slot or a start location of the $6^{th}$ symbol (namely, the symbol 5) of the slot, and four symbols are included in total. When the index of the first PUCCH resource set is 11 to 15, because the radio frequency retuning duration includes a symbol 5 to a symbol 8, to be specific, the last two symbols occupied by the first frequency hopping transmission and the first two symbols occupied by the second frequency hopping transmission are all within the radio frequency retuning duration, the first frequency hopping transmission actually occupies a symbol 0 to a symbol 4, the second frequency hopping transmission actually occupies a symbol 9 to a symbol 13, and a start location of radio frequency retuning is an end location of the $5^{th}$ symbol (symbol 4) of the slot or a start location of the $6^{th}$ symbol (symbol 5), and four symbols are included in total.

For the first and second cases of the implementation 3, the network device configures two partially same PUCCH resource sets for the first-type terminal device and the second-type terminal, and some frequency domain resources or some time domain resources of the two PUCCH resource sets are the same, so that some resources in an existing PUCCH resource set can be reused as much as possible to reduce network PUCCH resource overheads, and it is ensured that PUCCH transmission performance of the first-type terminal device does not deteriorate.

In this embodiment of this application, the maximum bandwidth supported by the first-type terminal device is small, for example, 20 MHz. If the first-type terminal device works in a bandwidth range, for example, 100 MHz, at least five 20 MHz BWPs need to be configured. If a PUCCH resource set is configured in each BWP, PUCCH resource overheads are high, and uplink resources are fragmented. This reduces resource utilization. However, if a PUCCH resource set is configured only in some BWPs, how a terminal device sends a PUCCH is an urgent problem to be resolved.

Figure 13:
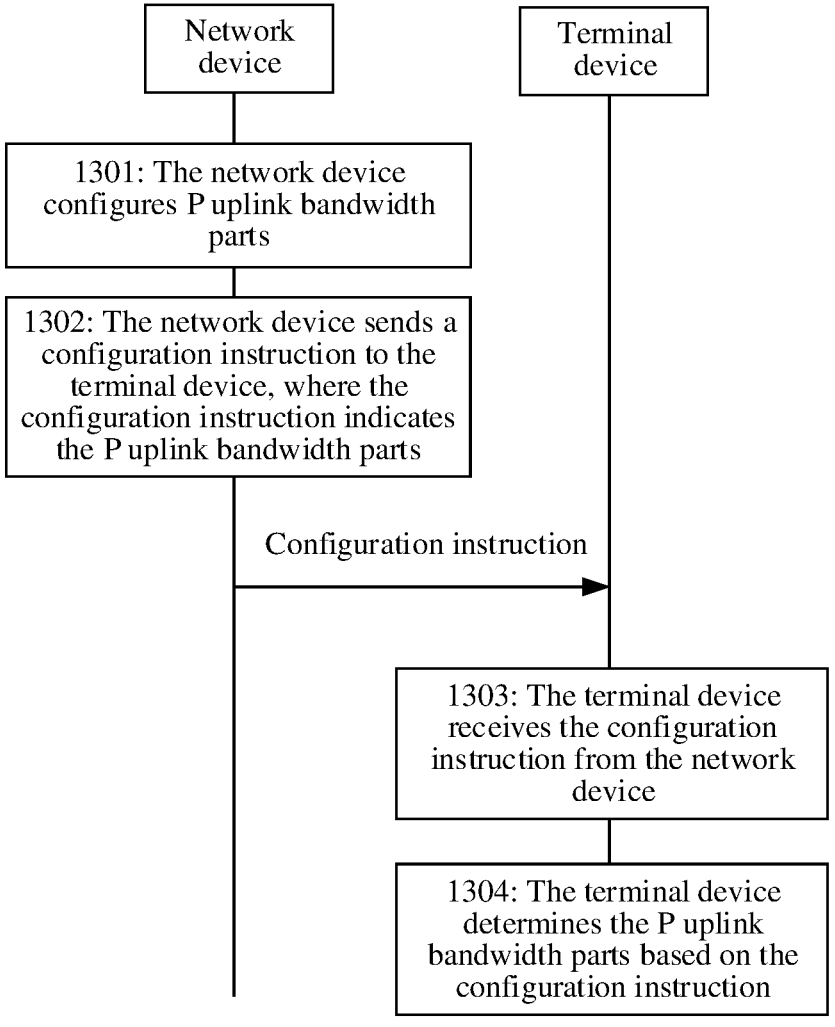
FIG. 13 is a schematic flowchart of a communication method according to an embodiment of this application.

FIG. 13 is a schematic flowchart of a communication method according to an embodiment of this application. Refer to FIG. 13. The method includes the following steps.

S1301: A network device configures P uplink bandwidth parts.

Q uplink bandwidth parts in the P uplink bandwidth parts include a dedicated PUCCH resource set, where Q is an integer greater than 0 and less than P, and P is an integer greater than 0. The dedicated PUCCH resource set includes at least one PUCCH resource.

It should be noted that a specific process in which the network device configures the dedicated PUCCH resource set is not limited in this embodiment of this application. Details are not described herein.

S1302: The network device sends a configuration instruction to a terminal device, where the configuration instruction indicates the P uplink bandwidth parts.

The network device may send the configuration instruction through RRC signaling, MAC CE signaling, or DCI signaling.

S1303: The terminal device receives the configuration instruction from the network device.

In this application, the terminal device may be a first-type terminal device or a second-type terminal device.

S1304: The terminal device determines the P uplink bandwidth parts based on the configuration instruction.

In this embodiment of this application, the terminal device may send uplink control information in the following manners.

Case 1: If a first uplink bandwidth part currently used by the terminal device includes the dedicated PUCCH resource set, a PUCCH resource may be determined from the dedicated PUCCH resource set, and the uplink control information is sent by using the PUCCH resource.

The currently used first uplink bandwidth part may also be referred to as an activated first uplink bandwidth part, and the first uplink bandwidth part is one of the P uplink bandwidth parts.

Case 2: If a first uplink bandwidth part currently used by the terminal device does not include the dedicated PUCCH resource set, it may be determined whether there is physical uplink shared channel (PUSCH) transmission in the first uplink bandwidth part at a moment at which the uplink control information needs to be sent.

If there is PUSCH transmission in the first uplink bandwidth part, the uplink control information is simultaneously carried on the PUSCH in the first uplink bandwidth part.

If there is no PUSCH transmission in the first uplink bandwidth part, the terminal device switches to a second uplink bandwidth part. The second uplink bandwidth part includes the dedicated PUCCH resource set, and the second uplink bandwidth part is one of the P uplink bandwidth parts. The terminal device sends the uplink control information by using a PUCCH resource in the dedicated PUCCH resource set in the second uplink bandwidth part.

It should be noted that how the terminal device specifically switches is not limited in this embodiment of this application. In a possible implementation, the terminal device may receive a switch command from the network device. The switch command indicates the terminal device to switch to the second uplink bandwidth part. The terminal device may switch to the second uplink bandwidth part based on the switch command. In a possible implementation, the terminal device may switch to the second uplink bandwidth part according to a predefined rule. Specific content of the predefined rule is not limited.

In the foregoing process, dedicated PUCCH resources are configured only on some BWPs, so that PUCCH overheads can be reduced, and uplink resource fragmentation can be alleviated. Further, when there is no PUCCH resource, uplink control information is sent through a PUSCH or another BWP is switched to, so that flexibility of PUCCH transmission can be improved, and timely and effective transmission of a PUCCH can be ensured.

In the foregoing embodiments provided in this application, the methods provided in embodiments of this application are separately described from a perspective of interaction between devices. To implement the functions in the methods provided in the foregoing embodiments of this application, the network device or the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In this embodiment of this application, module division is an example, and is merely a logical function division. During actual implementation, another division manner may be used. In addition, function modules in embodiments of this application may be integrated into one processor, or each of the modules may exist alone physically, or two or more modules are integrated into one module. The integrated module may be implemented in a form of hardware, or may be implemented in a form of a software function module.

Figure 14:
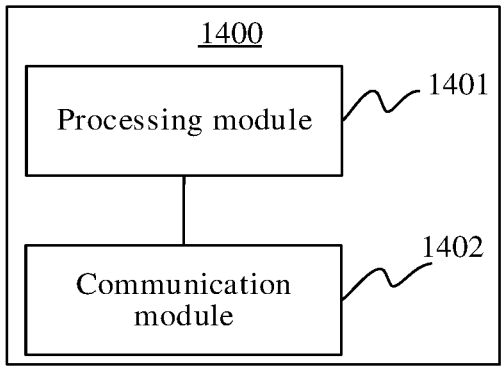
FIG. 14 is a schematic diagram of a structure of a communication apparatus according to an embodiment of this application.

Same as the foregoing concept, as shown in FIG. 14, an embodiment of this application further provides an apparatus 1400, configured to implement a function of the network device or the terminal device in the foregoing methods. For example, the apparatus may be a software module or a chip system. In this embodiment of this application, the chip system may include a chip, or may include a chip and another discrete component. The apparatus 1400 may include a processing module 1401 and a communication module 1402.

In this embodiment of this application, the communication module may also be referred to as a transceiver unit, and may include a sending unit and/or a receiving unit, which are respectively configured to perform sending and receiving steps of the network device or the terminal device in the foregoing method embodiments.

Figure 15:
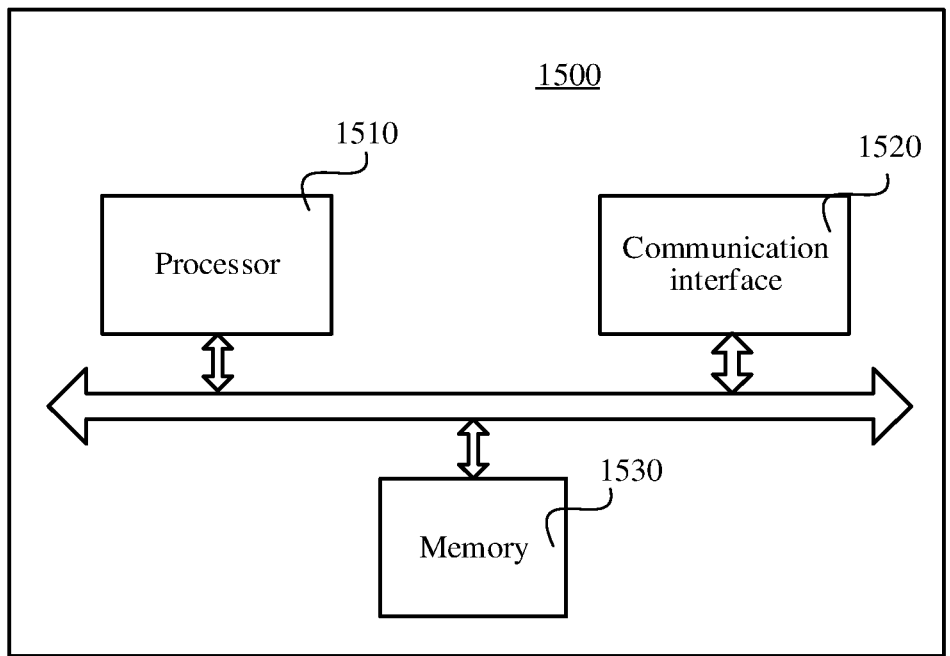
FIG. 15 is a schematic diagram of a structure of a communication apparatus according to an embodiment of this application.

The following describes in detail communication apparatuses provided in embodiments of this application with reference to FIG. 14 and FIG. 15. It should be understood that descriptions of apparatus embodiments correspond to the descriptions of the method embodiments. Therefore, for content that is not described in detail, refer to the foregoing method embodiments. For brevity, details are not described herein again.

The communication module may also be referred to as a transceiver machine, a transceiver, a transceiver apparatus, or the like. The processing module may also be referred to as a processor, a processing board, a processing module, a processing apparatus, or the like. Optionally, a component for implementing a receiving function in the communication module 1402 may be considered as a receiving unit, and a component for implementing a sending function in the communication module 1402 may be considered as a sending unit. In other words, the communication module 1402 includes the receiving unit and the sending unit. The communication module sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

When the communication apparatus 1400 performs the functions of the terminal device in the procedure shown in FIG. 4 in the foregoing embodiment, the communication module is configured to receive first indication information from a network device, where the first indication information indicates a first physical uplink control channel PUCCH resource set.

The processing module is configured to determine the first PUCCH resource set based on the first indication information.

The first PUCCH resource set is the same as a second PUCCH resource set, the first PUCCH resource set is different from a second PUCCH resource set, or the first PUCCH resource set is partially the same as a second PUCCH resource set. The first PUCCH resource set includes at least one PUCCH resource, and the first PUCCH resource set is configured for a first-type terminal device. The second PUCCH resource set includes at least one PUCCH resource, and the second PUCCH resource set is configured for a second-type terminal device. A maximum bandwidth supported by the first-type terminal device is less than a maximum bandwidth supported by the second-type terminal device.

When the communication apparatus 1400 performs the functions of the network device in the procedure shown in FIG. 4 in the foregoing embodiment, the processing module is configured to determine a first physical uplink control channel PUCCH resource set.

The communication module is configured to send first indication information to a terminal device, where the first indication information indicates the first PUCCH resource set. The first PUCCH resource set is the same as a second PUCCH resource set, the first PUCCH resource set is different from a second PUCCH resource set, or the first PUCCH resource set is partially the same as a second PUCCH resource set. The first PUCCH resource set includes at least one PUCCH resource, and the first PUCCH resource set is configured for a first-type terminal device. The second PUCCH resource set includes at least one PUCCH resource, and the second PUCCH resource set is configured for a second-type terminal device. A maximum bandwidth supported by the first-type terminal device is less than a maximum bandwidth supported by the second-type terminal device.

When the communication apparatus 1400 performs the functions of the terminal device in the procedure shown in FIG. 13 in the foregoing embodiment, the communication module is configured to receive a configuration instruction from a network device, where the configuration instruction indicates P uplink bandwidth parts, Q uplink bandwidth parts in the P uplink bandwidth parts include a dedicated physical uplink control channel PUCCH resource set, Q is an integer greater than 0 and less than P, and P is an integer greater than 0.

The processing module is configured to determine the P uplink bandwidth parts based on the configuration instruction.

When the communication apparatus 1400 performs the functions of the network device in the procedure shown in FIG. 13 in the foregoing embodiment, the processing module is for configuring P uplink bandwidth parts, where Q uplink bandwidth parts in the P uplink bandwidth parts include a dedicated PUCCH resource set, Q is an integer greater than 0 and less than or equal to P, and P is an integer greater than 0.

The communication module is configured to send a configuration instruction to a terminal device, where the configuration instruction indicates the P uplink bandwidth parts.

The foregoing is merely an example. The processing module and the communication module may further perform other functions. For more detailed descriptions, refer to related descriptions in the method embodiments shown in FIG. 4 to FIG. 13. Details are not described herein again.

FIG. 15 shows an apparatus 1500 according to an embodiment of this application. The apparatus shown in FIG. 15 may be an implementation of a hardware circuit of the apparatus shown in FIG. 14. The communication apparatus is applicable to the foregoing flowchart, and performs functions of the terminal device or the network device in the foregoing method embodiments. For ease of description, FIG. 15 shows only main components of the communication apparatus.

As shown in FIG. 15, the communication apparatus 1500 includes a processor 1510 and a communication interface 1520. The processor 1510 and the communication interface 1520 are coupled to each other. It may be understood that the communication interface 1520 may be a transceiver or an input/output interface. Optionally, the communication apparatus 1500 may further include a memory 1530, configured to store instructions executed by the processor 1510, or store input data required by the processor 1510 to run the instructions, or store data generated after the processor 1510 runs the instructions.

When the communication apparatus 1500 is configured to implement the method shown in any one of the procedures in FIG. 3 to FIG. 13, the processor 1510 is configured to implement the functions of the processing module 1401, and the communication interface 1520 is configured to implement the functions of the communication module 1402.

When the communication apparatus is a chip used in a terminal device, the chip in the terminal device implements the functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in a network device, the chip in the network device implements the functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in embodiments of this application may be a central processing module (CPU), may be another general-purpose processor, a digital signal processor (DSP), an application-specific integrated circuit (ASIC), a field programmable gate array (Field Programmable Gate Array, FPGA), another programmable logic device, a transistor logic device, a hardware component, or any combination thereof. The general-purpose processor may be a microprocessor or any conventional processor.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clearly that, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, comprising:

receiving first indication information, wherein the first indication information indicates a first physical uplink control channel (PUCCH) resource set; and determining the first PUCCH resource set based on the first indication information, wherein:

the first PUCCH resource set is different from a second PUCCH resource set, or the first PUCCH resource set is the same as a second PUCCH resource set, the first PUCCH resource set comprises at least one PUCCH resource, and the first PUCCH resource set is configured for a first-type terminal device, wherein the first-type terminal device is a reduced capability (REDCAP) terminal device, the second PUCCH resource set comprises at least one PUCCH resource, and the second PUCCH resource set is configured for a second-type terminal device, a maximum bandwidth supported by the first-type terminal device is less than a maximum bandwidth supported by the second-type terminal device, and the first PUCCH resource set is located in a first initial uplink bandwidth part (BWP), and the second PUCCH resource set is located in a second initial uplink BWP, wherein the first initial uplink BWP is configured for the first-type terminal device, and the second initial uplink BWP is configured for the second-type terminal device.

2. The method according to claim 1, wherein the first PUCCH resource set is different from the second PUCCH resource set, and a frequency domain resource of the first PUCCH resource set does not overlap a frequency domain resource of the second PUCCH resource set.

3. The method according to claim 1, wherein:
a frequency domain resource of the first PUCCH resource set comprises a first frequency domain resource and a second frequency domain resource, and
a frequency domain resource of the second PUCCH resource set comprises a third frequency domain resource and a fourth frequency domain resource, and
the first frequency domain resource is contiguous to the third frequency domain resource, or the second frequency domain resource is contiguous to the fourth frequency domain resource,
wherein a location index of the first frequency domain resource is less than a location index of the second frequency domain resource, and a location index of the third frequency domain resource is less than a location index of the fourth frequency domain resource.

4. The method according to claim 1, wherein there is an interval of M symbols between an end location of a time domain symbol for a first frequency hopping transmission on a PUCCH resource in the first PUCCH resource set and a start location of a time domain symbol occupied by the first-type terminal device for performing a second frequency hopping transmission in the first PUCCH resource set, and M is an integer greater than 0.

5. The method according to claim 1, wherein:
a difference between the first-type terminal device and the second-type terminal device include at least one of the following:
a maximum bandwidth supported by the first-type terminal device is one of 50 MHz, 40 MHz, 20 MHz, 15 MHz, 10 MHz, or 5 MHz, and a maximum bandwidth supported by the second-type terminal device is 100 MHz; or
the first-type terminal device supports two receive antennas and one transmit antenna, or the first-type terminal device supports one receive antenna and one transmit antenna; and the second-type terminal device supports four receive antennas and two transmit antenna.

6. A communication method, comprising:
determining a first physical uplink control channel (PUCCH) resource set; and
sending first indication information to a terminal device, wherein the first indication information indicates the first PUCCH resource set, wherein:
the first PUCCH resource set is different from a second PUCCH resource set, or the first PUCCH resource set is the same as a second PUCCH resource set,
the first PUCCH resource set comprises at least one PUCCH resource, and the first PUCCH resource set is configured for a first-type terminal device, wherein the first-type terminal device is a reduced capability (REDCAP) terminal device,
the second PUCCH resource set comprises at least one PUCCH resource, and the second PUCCH resource set is configured for a second-type terminal device,
a maximum bandwidth supported by the first-type terminal device is less than a maximum bandwidth supported by the second-type terminal device, and
the first PUCCH resource set is located in a first initial uplink bandwidth part (BWP), and the second PUCCH resource set is located in a second initial uplink BWP, wherein the first initial uplink BWP is configured for the first-type terminal device, and the second initial uplink BWP is configured for the second-type terminal device.

7. The method according to claim 6, wherein the first PUCCH resource set is different from the second PUCCH resource set, and a frequency domain resource of the first PUCCH resource set does not overlap a frequency domain resource of the second PUCCH resource set.

8. The method according to claim 6, wherein:
a frequency domain resource of the first PUCCH resource set comprises a first frequency domain resource and a second frequency domain resource, and
a frequency domain resource of the second PUCCH resource set comprises a third frequency domain resource and a fourth frequency domain resource, and
the first frequency domain resource is contiguous to the third frequency domain resource, or the second frequency domain resource is contiguous to the fourth frequency domain resource,
wherein a location index of the first frequency domain resource is less than a location index of the second frequency domain resource, and a location index of the third frequency domain resource is less than a location index of the fourth frequency domain resource.

9. The method according to claim 6, wherein there is an interval of M symbols between an end location of a time domain symbol for a first frequency hopping transmission on a PUCCH resource in the first PUCCH resource set and a start location of a time domain symbol occupied by the terminal device for performing a second frequency hopping transmission in the first PUCCH resource set, and M is an integer greater than 0.

10. The method according to claim 6, wherein:
a difference between the first-type terminal device and the second-type terminal device include at least one of the following:
a maximum bandwidth supported by the first-type terminal device is one of 50 MHz, 40 MHz, 20 MHz, 15 MHz, 10 MHz, or 5 MHz, and a maximum bandwidth supported by the second-type terminal device is 100 MHz; or
the first-type terminal device supports two receive antennas and one transmit antenna, or the first-type terminal device supports one receive antenna and one transmit antenna; and the second-type terminal device supports four receive antennas and two transmit antenna.

11. An apparatus, comprising:
one or more non-transitory memory storages comprising instructions; and
one or more processors in communication with the one or more non-transitory memory storages, wherein the instructions, when executed by the one or more processors, cause the apparatus to perform operations comprising:
receiving first indication information, wherein the first indication information indicates a first physical uplink control channel (PUCCH) resource set; and
determining the first PUCCH resource set based on the first indication information, wherein:
the first PUCCH resource set is different from a second PUCCH resource set, or the first PUCCH resource set is the same as a second PUCCH resource set;
the first PUCCH resource set comprises at least one PUCCH resource, and the first PUCCH resource set is configured for a first-type terminal device, wherein the first-type terminal device is a reduced capability (REDCAP) terminal device;

the second PUCCH resource set comprises at least one PUCCH resource, and the second PUCCH resource set is configured for a second-type terminal device;

a maximum bandwidth supported by the first-type terminal device is less than a maximum bandwidth supported by the second-type terminal device; and the first PUCCH resource set is located in a first initial uplink bandwidth part (BWP), and the second PUCCH resource set is located in a second initial uplink BWP, wherein the first initial uplink BWP is configured for the first-type terminal device, and the second initial uplink BWP is configured for the second-type terminal device.

12. The apparatus according to claim 11, wherein the first PUCCH resource set is different from the second PUCCH resource set, and a frequency domain resource of the first PUCCH resource set does not overlap a frequency domain resource of the second PUCCH resource set.

13. The apparatus according to claim 11, wherein:

a frequency domain resource of the first PUCCH resource set comprises a first frequency domain resource and a second frequency domain resource, and a frequency domain resource of the second PUCCH resource set comprises a third frequency domain resource and a fourth frequency domain resource, and the first frequency domain resource is contiguous to the third frequency domain resource, or the second frequency domain resource is contiguous to the fourth frequency domain resource, wherein a location index of the first frequency domain resource is less than a location index of the second frequency domain resource, and a location index of the third frequency domain resource is less than a location index of the fourth frequency domain resource.

14. The apparatus according to claim 11, wherein there is an interval of M symbols between an end location of a time domain symbol for a first frequency hopping transmission on a PUCCH resource in the first PUCCH resource set and a start location of a time domain symbol occupied by the first-type terminal device for performing a second frequency hopping transmission in the first PUCCH resource set, and M is an integer greater than 0.

15. The apparatus according to claim 11, wherein:

a difference between the first-type terminal device and the second-type terminal device include at least one of the following:

a maximum bandwidth supported by the first-type terminal device is one of 50 MHz, 40 MHz, 20 MHz, 15 MHz, 10 MHz, or 5 MHz, and a maximum bandwidth supported by the second-type terminal device is 100 MHz; or the first-type terminal device supports two receive antennas and one transmit antenna, or the first-type terminal device supports one receive antenna and one transmit antenna; and the second-type terminal device supports four receive antennas and two transmit antenna.

16. An apparatus, comprising:

one or more non-transitory memory storages comprising instructions; and one or more processors in communication with the one or more non-transitory memory storages, wherein the instructions, when executed by the one or more processors, cause the apparatus to perform operations comprising:

determining a first physical uplink control channel (PUCCH) resource set; and sending first indication information to a terminal device, wherein the first indication information indicates the first PUCCH resource set, wherein:

the first PUCCH resource set is different from a second PUCCH resource set, or the first PUCCH resource set is the same as a second PUCCH resource set, the first PUCCH resource set comprises at least one PUCCH resource, and the first PUCCH resource set is configured for a first-type terminal device, wherein the first-type terminal device is a reduced capability (RED-CAP) terminal device, the second PUCCH resource set comprises at least one PUCCH resource, and the second PUCCH resource set is configured for a second-type terminal device, a maximum bandwidth supported by the first-type terminal device is less than a maximum bandwidth supported by the second-type terminal device, and the first PUCCH resource set is located in a first initial uplink bandwidth part (BWP), and the second PUCCH resource set is located in a second initial uplink BWP, wherein the first initial uplink BWP is configured for the first-type terminal device, and the second initial uplink BWP is configured for the second-type terminal device.

17. The apparatus according to claim 16, wherein the first PUCCH resource set is different from the second PUCCH resource set, and a frequency domain resource of the first PUCCH resource set does not overlap a frequency domain resource of the second PUCCH resource set.

18. The apparatus according to claim 16, wherein:

a frequency domain resource of the first PUCCH resource set comprises a first frequency domain resource and a second frequency domain resource, and a frequency domain resource of the second PUCCH resource set comprises a third frequency domain resource and a fourth frequency domain resource; and the first frequency domain resource is contiguous to the third frequency domain resource, or the second frequency domain resource is contiguous to the fourth frequency domain resource, wherein a location index of the first frequency domain resource is less than a location index of the second frequency domain resource, and a location index of the third frequency domain resource is less than a location index of the fourth frequency domain resource.

19. The apparatus according to claim 16, wherein there is an interval of M symbols between an end location of a time domain symbol for a first frequency hopping transmission on a PUCCH resource in the first PUCCH resource set and a start location of a time domain symbol occupied by the terminal device for performing a second frequency hopping transmission in the first PUCCH resource set, and M is an integer greater than 0.

20. The apparatus according to claim 16, wherein:

a difference between the first-type terminal device and the second-type terminal device include at least one of the following:

a maximum bandwidth supported by the first-type terminal device is one of 50 MHz, 40 MHz, 20 MHz, 15 MHz, 10 MHz, or 5 MHz, and a maximum bandwidth supported by the second-type terminal device is 100 MHz; or the first-type terminal device supports two receive antennas and one transmit antenna, or the first-type terminal device supports one receive antenna and one transmit antenna; and the second-type terminal device supports four receive antennas and two transmit antenna.

\* \* \* \* \*